United States Patent
Roxlo

(10) Patent No.: US 6,947,613 B1
(45) Date of Patent: Sep. 20, 2005

(54) WAVELENGTH SELECTIVE SWITCH AND EQUALIZER

(75) Inventor: Charles B. Roxlo, Saratoga, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 326 days.

(21) Appl. No.: 10/365,226

(22) Filed: Feb. 11, 2003

(51) Int. Cl.$^7$ .............................. G02F 1/01; G02B 6/34
(52) U.S. Cl. .............................................. 385/1; 385/37
(58) Field of Search ........................... 385/1, 5, 10, 15, 385/16, 17, 18, 27, 28, 37

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Szikvai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,671 A | 5/1969 | Chitayar | 356/106 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |

(Continued)

FOREIGN PATENT DOCUMENTS

| | | | | |
|---|---|---|---|---|
| DE | 32 33 195 A1 | 3/1983 | ........... | H01L/23/52 |
| DE | 43 23 799 A1 | 1/1994 | ........... | H01L/23/50 |
| DE | 197 23 618 A1 | 12/1997 | ............. | G03F/1/14 |
| DE | 197 51 716 A1 | 5/1998 | ........... | G02B/27/14 |
| DE | 198 46 532 C1 | 11/1998 | ........... | G02B/27/09 |
| EP | 0 089 044 A2 | 9/1983 | ........... | H01L/23/10 |
| EP | 0 261 901 A2 | 3/1988 | ........... | G09G/3/36 |
| EP | 0 314 437 A1 | 10/1988 | ........... | H01L/25/08 |
| EP | 0 304 263 A2 | 2/1989 | ......... | H01L/25/065 |
| EP | 0 306 308 A2 | 3/1989 | ............ | H04N/3/14 |

(Continued)

OTHER PUBLICATIONS

R. Apte, "Grating Light Valves for High Resolution Displays", Solid State Sensors and Actuator Workshop, Ph D. Dissertation, Stanford University (Jun. 1994).

O. Solgaard, "Integrated Semiconductor Light Modulators for Fiber-Optic and Display Applications", Ph.D. Dissertation, Stanford University Feb., 1992.

J. Neff, "Two-Dimensional Spatial Light Modulators: A Tutorial", Proceedings of the IEEE, vol. 78, No. 5 (May 1990), pp. 826–855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69–78.

(Continued)

*Primary Examiner*—Frank G. Font
*Assistant Examiner*—Mary El-Shammaa
(74) *Attorney, Agent, or Firm*—Okamoto & Benedicto LLP

(57) ABSTRACT

A device comprising a light modulator including a plurality of elements wherein each element is selectively operable such that the plurality of elements are dynamically configurable to combine selected ones of a plurality of grating periods such that selected portions of an incident light are directed into one or more distinct modes wherein each distinct mode corresponds to a grating period. The device can be used as a 1×N wavelength selective switch and equalizer where N is the number of output channels.

20 Claims, 12 Drawing Sheets

U.S. PATENT DOCUMENTS

| | | | |
|---|---|---|---|
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Lamerd | 29/626 |
| 3,861,784 A | 1/1975 | Torok | 350/162.8 |
| 3,862,350 A | 1/1975 | Dill et al. | 178/7.3 D |
| 3,862,360 A | 1/1975 | Dill et al. | 178/7.3 D |
| 3,871,014 A | 3/1975 | King et al. | 357/67 |
| 3,886,310 A | 5/1975 | Goldberg et al | 178/7.5 D |
| 3,896,338 A | 7/1975 | Nathanson et al. | 315/373 |
| 3,915,548 A | 10/1975 | Opittiek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/181 |
| 3,942,245 A | 3/1976 | Jackson et al. | 29/591 |
| 3,943,281 A | 3/1976 | Keller et al. | 29/591 |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/71 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/291 |
| 4,426,768 A | 1/1984 | Black et al. | 29/581 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/402 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 158/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |

| Patent No. | Date | Inventor | Class |
|---|---|---|---|
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 322/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/5.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 4,999,318 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,919 A | 7/1991 | Hidaka | 346/160 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/281 |
| 5,101,184 A | 3/1992 | Antes | 235/454 |
| 5,101,236 A | 3/1992 | Nelson et al. | 355/228 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/18 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |

| Patent No. | Date | Inventor | Class |
|---|---|---|---|
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/97 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,229,597 A | 7/1993 | Fukatsu | |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/283 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/576 |
| 5,296,950 A | 3/1994 | Lin et al. | 359/9 |
| 5,298,460 A | 3/1994 | Nishiguchi et al. | 437/183 |
| 5,299,017 A | 3/1994 | Sakata | 359/41 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |

| Patent | Date | Inventor | Class |
|---|---|---|---|
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | O'Hont et al | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |
| 5,371,618 A | 12/1994 | Tai et al. | 359/53 |
| 5,377,705 A | 1/1995 | Smith, Jr. et al. | 134/95.3 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/547 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/261 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |

| | | | | | | |
|---|---|---|---|---|---|---|
| 5,523,628 A | 6/1996 | Williams et al. ............. 257/777 | | 5,898,515 A | 4/1999 | Furlani et al. ............. 359/290 |
| 5,523,803 A | 6/1996 | Urbanus et al. ............. 348/771 | | 5,903,243 A | 5/1999 | Jones ............................ 345/7 |
| 5,523,878 A | 6/1996 | Wallace et al. ............. 359/290 | | 5,903,395 A | 5/1999 | Rallison et al. ............. 359/630 |
| 5,523,881 A | 6/1996 | Florence et al. ............ 359/561 | | 5,904,737 A | 5/1999 | Preston et al. ................. 8/158 |
| 5,523,920 A | 6/1996 | Machuga et al. ............ 261/767 | | 5,910,856 A | 6/1999 | Ghosh et al. ................ 359/291 |
| 5,524,155 A | 6/1996 | Weaver ........................ 385/24 | | 5,912,094 A | 6/1999 | Aksyuk et al. ................. 430/5 |
| 5,526,834 A | 6/1996 | Mielnik et al. .............. 134/105 | | 5,912,608 A | 6/1999 | Asada ........................ 335/222 |
| 5,534,107 A | 7/1996 | Gray et al. ............. 156/643.1 | | 5,914,801 A | 6/1999 | Dhuler et al. ................ 359/230 |
| 5,534,883 A | 7/1996 | Koh .............................. 345/3 | | 5,915,168 A | 6/1999 | Salatino et al. ............. 438/110 |
| 5,539,422 A | 7/1996 | Heacock et al. ................. 345/8 | | 5,919,548 A | 7/1999 | Barron et al. ............... 428/138 |
| 5,544,306 A | 8/1996 | Deering et al. ............ 395/164 | | 5,920,411 A | 7/1999 | Duck et al. .................. 359/127 |
| 5,552,635 A | 9/1996 | Kim et al. | | 5,920,418 A | 7/1999 | Shiono et al. ............. 359/246 |
| 5,554,304 A | 9/1996 | Suzuki .......................... 216/2 | | 5,923,475 A | 7/1999 | Kurtz et al. ................. 359/619 |
| 5,576,878 A | 11/1996 | Henck ....................... 359/224 | | 5,926,309 A | 7/1999 | Little .......................... 359/293 |
| 5,602,671 A | 2/1997 | Hornbeck .................... 359/224 | | 5,926,318 A | 7/1999 | Hebert ....................... 359/618 |
| 5,606,181 A | 2/1997 | Sakuma et al. ................ 257/88 | | 5,942,791 A | 8/1999 | Shorrocks et al. .......... 257/522 |
| 5,606,447 A | 2/1997 | Asada et al. ................ 359/199 | | 5,949,390 A | 9/1999 | Nomura et al. ............... 345/32 |
| 5,610,438 A | 3/1997 | Wallace et al. ............. 257/682 | | 5,949,570 A | 9/1999 | Shiono et al. .............. 359/291 |
| 5,623,361 A | 4/1997 | Engle ......................... 359/291 | | 5,953,161 A | 9/1999 | Troxell et al. .............. 359/618 |
| 5,629,566 A | 5/1997 | Doi et al. .................... 257/789 | | 5,955,771 A | 9/1999 | Kurtz et al. ................. 257/419 |
| 5,629,801 A | 5/1997 | Staker et al. ................ 359/572 | | 5,963,788 A | 10/1999 | Barron et al. ................. 438/48 |
| 5,640,216 A | 6/1997 | Hasegawa et al. ............. 349/58 | | 5,978,127 A | 11/1999 | Berg .......................... 359/279 |
| 5,658,698 A | 8/1997 | Yagi et al. ..................... 430/11 | | 5,982,553 A | 11/1999 | Bloom et al. ............... 359/627 |
| 5,661,592 A | 8/1997 | Bornstein et al. ........... 359/291 | | 5,986,634 A | 11/1999 | Alioshin ..................... 345/126 |
| 5,661,593 A | 8/1997 | Engle ......................... 359/292 | | 5,986,796 A | 11/1999 | Miles ......................... 359/260 |
| 5,663,817 A | 9/1997 | Frapin et al. .................... 349/5 | | 5,995,303 A | 11/1999 | Honguh et al. ............. 359/708 |
| 5,668,611 A | 9/1997 | Ernstoff et al. ............. 348/771 | | 5,999,319 A | 12/1999 | Castracane ................. 359/573 |
| 5,673,139 A | 9/1997 | Johnson ..................... 359/291 | | 6,004,912 A | 12/1999 | Gudeman ................... 508/577 |
| 5,677,783 A | 10/1997 | Bloom et al. ............... 359/224 | | 6,012,336 A | 1/2000 | Eaton et al. |
| 5,689,361 A | 11/1997 | Damen et al. ............... 359/284 | | 6,016,222 A | 1/2000 | Setani et al. ................ 359/571 |
| 5,691,836 A | 11/1997 | Clark ......................... 359/247 | | 6,025,859 A | 2/2000 | Ide et al. .................... 347/135 |
| 5,694,740 A | 12/1997 | Martin et al. ................. 53/431 | | 6,038,057 A | 3/2000 | Brazas, Jr. et al. ......... 359/291 |
| 5,696,560 A | 12/1997 | Songer ....................... 348/436 | | 6,040,748 A | 3/2000 | Gueissaz ...................... 335/78 |
| 5,699,740 A | 12/1997 | Gelbart ....................... 101/477 | | 6,046,840 A | 4/2000 | Huibers ...................... 359/291 |
| 5,704,700 A | 1/1998 | Kappel et al. ................. 353/31 | | 6,055,090 A | 4/2000 | Miles ......................... 359/291 |
| 5,707,160 A | 1/1998 | Bowen ....................... 400/472 | | 6,057,520 A | 5/2000 | Goodwin-Johansson .... 200/181 |
| 5,712,649 A | 1/1998 | Tosaki ........................... 345/8 | | 6,061,166 A | 5/2000 | Furlani et al. ............. 359/254 |
| 5,713,652 A | 2/1998 | Zavracky et al. ............ 353/122 | | 6,061,489 A | 5/2000 | Ezra .......................... 385/115 |
| 5,726,480 A | 3/1998 | Pister ......................... 257/415 | | 6,062,461 A | 5/2000 | Sparks et al. ............. 228/123.1 |
| 5,731,802 A | 3/1998 | Aras et al. .................. 345/148 | | 6,064,404 A | 5/2000 | Aras et al. .................. 345/507 |
| 5,734,224 A | 3/1998 | Tagawa et al. .............. 313/493 | | 6,069,392 A | 5/2000 | Tai et al. .................... 257/419 |
| 5,742,373 A | 4/1998 | Alvelda ...................... 349/204 | | 6,071,652 A | 6/2000 | Feldman et al. ................ 430/5 |
| 5,744,752 A | 4/1998 | McHerron et al. ......... 174/52.4 | | 6,075,632 A | 6/2000 | Braun ........................ 359/124 |
| 5,745,271 A | 4/1998 | Ford et al. .................. 359/130 | | 6,084,626 A | 7/2000 | Ramanujan et al. ........ 347/239 |
| 5,757,354 A | 5/1998 | Kawamura .................. 345/126 | | 6,088,102 A | 7/2000 | Manhart ..................... 356/354 |
| 5,757,536 A | 5/1998 | Ricco et al. ................. 359/224 | | 6,090,717 A | 7/2000 | Powell et al. ............... 438/710 |
| 5,764,280 A | 6/1998 | Bloom et al. ................. 348/53 | | 6,091,521 A | 7/2000 | Popovich ..................... 359/15 |
| 5,768,009 A | 6/1998 | Little ......................... 359/293 | | 6,096,576 A | 8/2000 | Corbin et al. ............... 438/108 |
| 5,773,473 A | 6/1998 | Green et al. .................. 438/26 | | 6,096,656 A | 8/2000 | Matzke et al. |
| 5,793,519 A | 8/1998 | Furlani et al. ............. 359/291 | | 6,097,352 A | 8/2000 | Zavracky et al. .............. 345/7 |
| 5,798,743 A | 8/1998 | Bloom ........................ 345/90 | | 6,101,036 A | 8/2000 | Bloom ....................... 359/567 |
| 5,798,805 A | 8/1998 | Ooi et al. .................... 349/10 | | 6,115,168 A | 9/2000 | Zhao et al. ................. 359/247 |
| 5,801,074 A | 9/1998 | Kim et al. ................... 438/125 | | 6,122,299 A | 9/2000 | DeMars et al. ............... 372/20 |
| 5,802,222 A | 9/1998 | Rasch et al. .................. 385/1 | | 6,123,985 A | 9/2000 | Robinson et al. ........... 427/162 |
| 5,808,323 A | 9/1998 | Spaeth et al. ................. 257/88 | | 6,124,145 A | 9/2000 | Stemme et al. ............... 438/26 |
| 5,808,797 A | 9/1998 | Bloom et al. ............... 359/572 | | 6,130,770 A | 10/2000 | Bloom ....................... 359/224 |
| 5,815,126 A | 9/1998 | Fan et al. ....................... 345/8 | | 6,144,481 A | 11/2000 | Kowarz et al. ............. 359/291 |
| 5,825,443 A | 10/1998 | Kawasaki et al. ............ 349/95 | | 6,147,789 A | 11/2000 | Gelbart ....................... 359/231 |
| 5,832,148 A | 11/1998 | Yariv | | 6,154,259 A | 11/2000 | Hargis et al. ............... 348/759 |
| 5,835,255 A | 11/1998 | Miles ......................... 359/291 | | 6,154,305 A | 11/2000 | Dickensheets et al. |
| 5,835,256 A | 11/1998 | Huibers ...................... 359/291 | | 6,163,026 A | 12/2000 | Bawolek et al. ............. 250/351 |
| 5,837,562 A | 11/1998 | Cho ............................ 438/51 | | 6,163,402 A | 12/2000 | Chou et al. ................. 359/443 |
| 5,841,579 A | 11/1998 | Bloom et al. ............... 359/572 | | 6,169,624 B1 | 1/2001 | Godil et al. ................. 359/237 |
| 5,841,929 A | 11/1998 | Komatsu et al. | | 6,172,796 B1 | 1/2001 | Kowarz et al. ............. 359/290 |
| 5,844,711 A | 12/1998 | Long, Jr. .................... 359/291 | | 6,172,797 B1 | 1/2001 | Huibers ...................... 359/291 |
| 5,847,859 A | 12/1998 | Murata ....................... 359/201 | | 6,177,980 B1 | 1/2001 | Johnson ....................... 355/67 |
| 5,862,164 A | 1/1999 | Hill ............................. 372/27 | | 6,181,458 B1 | 1/2001 | Brazas, Jr. et al. ......... 359/290 |
| 5,868,854 A | 2/1999 | Kojima et al. ............... 134/1.3 | | 6,188,519 B1 | 2/2001 | Johnson ..................... 359/572 |
| 5,886,675 A | 3/1999 | Aye et al. ...................... 345/7 | | 6,195,196 B1 | 2/2001 | Kimura et al. .............. 359/295 |
| 5,892,505 A | 4/1999 | Tropper ...................... 345/208 | | 6,197,610 B1 | 3/2001 | Toda .......................... 438/50 |
| 5,895,233 A | 4/1999 | Higashi et al. .............. 438/107 | | 6,210,988 B1 | 4/2001 | Howe et al. .................. 438/50 |

| | | | | | | | | |
|---|---|---|---|---|---|---|---|---|
| 6,215,579 | B1 | 4/2001 | Bloom et al. ............... 359/298 | EP | 0 499 566 | A2 | 8/1992 | ............ G06F/3/033 |
| 6,219,015 | B1 | 4/2001 | Bloom et al. ............... 345/87 | EP | 0 528 646 | A1 | 2/1993 | ............ G09G/3/02 |
| 6,222,954 | B1 | 4/2001 | Riza ............... 385/18 | EP | 0 530 760 | A2 | 3/1993 | ............ G09G/3/34 |
| 6,229,650 | B1 | 5/2001 | Reznichenko et al. ...... 359/566 | EP | 0 550 189 | A1 | 7/1993 | ............ G02F/1/315 |
| 6,229,683 | B1 | 5/2001 | Goodwin-Johansoon .... 361/233 | EP | 0 610 665 | A1 | 8/1994 | ............ G09G/3/34 |
| 6,241,143 | B1 | 6/2001 | Kuroda ............... 228/110.1 | EP | 0 627 644 | A2 | 12/1994 | ............ G02B/27/00 |
| 6,249,381 | B1 | 6/2001 | Suganuma | EP | 0 627 850 | A1 | 12/1994 | ............ H04N/5/64 |
| 6,251,842 | B1 | 6/2001 | Gudeman ............... 508/577 | EP | 0 643 314 | A2 | 3/1995 | ............ G02B/27/00 |
| 6,252,697 | B1 | 6/2001 | Hawkins et al. ............. 359/290 | EP | 0 654 777 | A1 | 5/1995 | ............ G09G/3/34 |
| 6,254,792 | B1 | 7/2001 | Van Buskirk et al. ........ 216/13 | EP | 0 658 868 | A1 | 6/1995 | ............ G09G/3/34 |
| 6,261,494 | B1 | 7/2001 | Zavracky et al. ........... 264/104 | EP | 0 658 830 | A1 | 12/1995 | ............ G09G/3/34 |
| 6,268,952 | B1 | 7/2001 | Godil et al. ............... 359/291 | EP | 0 689 078 | A1 | 12/1995 | ............ G02B/26/18 |
| 6,271,145 | B1 | 8/2001 | Toda ............... 438/706 | EP | 0 801 319 | A1 | 10/1997 | ............ G02B/26/00 |
| 6,271,808 | B1 | 8/2001 | Corbin ............... 345/7 | EP | 0 851 492 | A2 | 7/1998 | ......... H01L/23/538 |
| 6,274,469 | B1 | 8/2001 | Yu ............... 438/592 | EP | 1 003 071 | A2 | 5/2000 | ............ G03B/27/72 |
| 6,282,213 | B1 | 8/2001 | Gutin et al. | EP | 1 014 143 | A1 | 6/2000 | ............ G02B/26/08 |
| 6,286,231 | B1 | 9/2001 | Bergman et al. ............... 34/410 | EP | 1 040 927 | AC | 10/2000 | ............ B41J/2/455 |
| 6,290,859 | B1 | 9/2001 | Fleming et al. ............... 216/2 | GB | 2 117 564 | A | 10/1983 | ............ H01L/25/08 |
| 6,290,864 | B1 | 9/2001 | Patel et al. ............... 216/79 | GB | 2 118 365 | A | 10/1983 | ............ H01L/27/13 |
| 6,300,148 | B1 | 10/2001 | Birdsley et al. ............. 438/15 | GB | 2 266 385 | A | 10/1993 | ............ G02B/23/10 |
| 6,303,986 | B1 | 10/2001 | Shook ............... 257/680 | GB | 2 296 152 | A | 6/1996 | ............ H04N/13/04 |
| 6,310,018 | B1 | 10/2001 | Behr et al. ............... 510/175 | GB | 2 319 424 | A | 5/1998 | ............ H04N/13/04 |
| 6,313,901 | B1 | 11/2001 | Cacharelis | JP | 53-39068 | | 4/1978 | ............ H01L/23/12 |
| 6,323,984 | B1 | 11/2001 | Trisnadi ............... 359/245 | JP | 55-111151 | | 8/1980 | ............ H01L/27/00 |
| 6,327,071 | B1 | 12/2001 | Kimura ............... 359/291 | JP | 57-31166 | | 2/1982 | ............ H01L/23/48 |
| 6,342,960 | B1 | 1/2002 | McCullough ............... 359/124 | JP | 57-210638 | | 12/1982 | ............ H01L/21/60 |
| 6,346,430 | B1 | 2/2002 | Raj et al. | JP | 60-49638 | | 3/1985 | ............ H01L/21/60 |
| 6,356,577 | B1 | 3/2002 | Miller ............... 372/107 | JP | 60-94756 | | 5/1985 | ............ H01L/25/04 |
| 6,356,689 | B1 | 3/2002 | Greywall ............... 385/52 | JP | 60-250639 | | 12/1985 | ............ H01L/21/58 |
| 6,359,333 | B1 | 3/2002 | Wood et al. ............... 257/704 | JP | 61-142750 | | 6/1986 | ............ H01L/21/60 |
| 6,384,959 | B1 | 5/2002 | Furlani et al. ............... 359/291 | JP | 61-145838 | | 7/1986 | ............ H01L/21/60 |
| 6,387,723 | B1 | 5/2002 | Payne et al. ............... 438/48 | JP | 63-234767 | | 9/1988 | ............ H04N/1/04 |
| 6,392,309 | B1 | 5/2002 | Wataya et al. ............... 257/796 | JP | 63-305323 | | 12/1988 | ............ G02F/1/13 |
| 6,396,789 | B1 | 5/2002 | Guerra et al. ............... 369/112 | JP | 1-155637 | | 6/1989 | ............ H01L/21/66 |
| 6,418,152 | B1 | 7/2002 | Davis | JP | 40-1155637 | | 6/1989 | ............ H01L/21/92 |
| 6,421,179 | B1 | 7/2002 | Gutin et al. ............... 359/572 | JP | 2219092 | | 8/1990 | ............ G09G/3/28 |
| 6,438,954 | B1 | 8/2002 | Goetz et al. | JP | 4-333015 | | 11/1992 | ............ G02B/27/18 |
| 6,445,502 | B1 | 9/2002 | Islam et al. ............... 359/571 | JP | 7-281161 | | 10/1995 | ............ G02F/1/1333 |
| 6,452,260 | B1 | 9/2002 | Corbin et al. ............... 257/606 | JP | 3288369 | | 3/2002 | ............ G02B/26/06 |
| 6,466,354 | B1 | 10/2002 | Gudeman ............... 359/247 | WO | WO 90/13913 | | 11/1990 | ............ H01L/23/10 |
| 6,479,811 | B1 | 11/2002 | Kruschwitz et al. | WO | WO 92/12506 | | 7/1992 | ............ G09F/9/37 |
| 6,480,634 | B1 | 11/2002 | Corrigan ............... 385/4 | WO | WO 93/02269 | | 2/1993 | ............ E06B/5/10 |
| 6,497,490 | B1 | 12/2002 | Miller ............... 359/614 | WO | WO 93/09472 | | 5/1993 | ............ G03F/7/20 |
| 6,525,863 | B1 | 2/2003 | Riza ............... 359/290 | WO | WO 93/1844128 | | 9/1993 | ............ G02B/27/00 |
| 6,563,974 | B2 | 5/2003 | Riza ............... 385/18 | WO | WO 93/22694 | | 11/1993 | ............ G02B/5/18 |
| 6,565,222 | B1 | 5/2003 | Ishii et al. ............... 359/583 | WO | WO 94/09473 | | 4/1994 | ............ G09G/3/34 |
| 6,569,717 | B1 | 5/2003 | Murade | WO | WO 94/29761 | | 12/1994 | ............ G02B/27/24 |
| 6,731,840 | B2 * | 5/2004 | Worchesky et al. ............ 385/37 | WO | WO 95/11473 | | 4/1995 | ............ G02B/27/00 |
| 2001/0019454 | A1 | 9/2001 | Tadic-Galeb et al. ........ 359/649 | WO | WO 96/02941 | | 2/1996 | ............ H01L/23/02 |
| 2002/0015230 | A1 | 2/2002 | Pilossof et al. ............... 359/558 | WO | WO 96/08031 | | 3/1996 | ............ H01J/29/12 |
| 2002/0021485 | A1 | 2/2002 | Pilossof ............... 359/295 | WO | WO 96/41217 | | 12/1996 | ............ G02B/5/18 |
| 2002/0079432 | A1 | 6/2002 | Lee et al. ............... 250/216 | WO | WO 96/41224 | | 12/1996 | ............ G02B/19/00 |
| 2002/0105725 | A1 | 8/2002 | Sweatt et al. ............... 359/566 | WO | WO 97/22033 | | 6/1997 | ............ G02B/27/22 |
| 2002/0112746 | A1 | 8/2002 | DeYoung et al. ............ 134/36 | WO | WO 97/26569 | | 7/1997 | ............ G02B/5/18 |
| 2002/0131228 | A1 | 9/2002 | Potter | WO | WO 98/05935 | | 2/1998 | ............ G01L/9/06 |
| 2002/0131230 | A1 | 9/2002 | Potter ............... 361/277 | WO | WO 98/24240 | | 6/1998 | ............ H04N/9/31 |
| 2002/0135708 | A1 | 9/2002 | Murden et al. | WO | WO 98/41893 | | 9/1998 | ............ G02B/26/08 |
| 2002/0176151 | A1 | 11/2002 | Moon et al. | WO | WO 99/07146 | | 2/1999 | ............ H04N/7/16 |
| 2002/0195418 | A1 | 12/2002 | Kowarz et al. | WO | WO99/12208 | | 3/1999 | ......... H01L/25/065 |
| 2002/0196492 | A1 | 12/2002 | Trisnadi et al. | WO | WO 99/23520 | | 5/1999 | ............ G02B/26/08 |
| 2003/0056078 | A1 | 3/2003 | Johansson et al. | WO | WO 99/34484 | | 7/1999 | |
| | | | | WO | WO 99/59335 | | 11/1999 | ............ H04N/5/765 |
| | | FOREIGN PATENT DOCUMENTS | | WO | WO 99/63388 | | 12/1999 | ............ G02B/27/22 |
| EP | 0 322 714 | A2 | 7/1989 | ............ G02B/5/30 | WO | WO 99/67671 | | 12/1999 | ............ N02B/26/08 |
| EP | 0 627 644 | A3 | 9/1990 | ............ G02B/27/00 | WO | WO 00/04718 | | 1/2000 | ............ H04N/7/167 |
| EP | 0 417 039 | A1 | 3/1991 | ............ G03B/21/20 | WO | WO 00/07225 | | 2/2000 | ............ H01L/21/00 |
| EP | 0 423 513 | A2 | 4/1991 | ............ H01S/3/085 | WO | WO 01/04674 | A1 | 1/2001 | ............ G02B/6/12 |
| EP | 0 436 738 | A1 | 7/1991 | ............ H04N/5/74 | WO | WO 01/006297 | A3 | 1/2001 | ............ G02B/27/10 |
| EP | 0 458 316 | A2 | 11/1991 | ............ G06K/11/06 | WO | WO 01/57581 | A3 | 8/2001 | ............ G02B/27/48 |
| EP | 0 477 566 | A2 | 4/1992 | ............ G02B/26/08 | WO | WO 02/025348 | | 3/2002 | ............ G02B/26/02 |
| EP | 0 488 326 | A3 | 6/1992 | ............ G09G/3/28 | WO | WO 02/31575 | A2 | 4/2002 | ............ G02B/27/00 |

| | | | | |
|---|---|---|---|---|
| WO | WO 02/058111 A2 | 7/2002 | | |
| WO | WO 02/065184 A3 | 8/2002 | ........... | G02B/27/12 |
| WO | WO 02/073286 A2 | 9/2002 | ........... | G02B/26/08 |
| WO | WO 02/084375 A1 | 10/2002 | ........... | G02B/26/08 |
| WO | WO 02/084397 A3 | 10/2002 | ........... | G02B/27/18 |
| WO | WO 03/001281 A1 | 1/2003 | ............ | G02F/1/01 |
| WO | WO 03/001716 A1 | 1/2003 | ............ | H04J/14/02 |
| WO | WO 03/012523 A1 | 2/2003 | ........... | G02B/26/00 |
| WO | WO 03 016965 A1 | 2/2003 | ............ | G02B/5/18 |
| WO | WO 03/023849 A1 | 3/2003 | ........... | H01L/23/02 |
| WO | WO 03/025628 A2 | 3/2003 | | |

OTHER PUBLICATIONS

R. Gerhard–Multhaupt, "Light–Valve Technologies for High–Definition Television Projection Displays", vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alveda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alveda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997. pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum— Optical Components Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991, IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992). 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID '99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/Si$_3$N$_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

US 6,947,613 B1

WAVELENGTH SELECTIVE SWITCH AND EQUALIZER

FIELD OF THE INVENTION

The present invention relates to an apparatus for switching and equalizing a wavelength signal. More particularly, this invention relates to a wavelength signal switch and equalizer including a multi-period grating light valve type device array.

BACKGROUND OF THE INVENTION

In WDM (wavelength division multiplex) optical communication, multiple component wavelengths of light each carry a communication signal. Each of the multiple component wavelengths of light form a WDM channel. An OADM (optical add-drop multiplexer) is used for WDM signal management. WDM signals are transmitted from location to location using the channels. At a particular location, the signal within each channel is either passed for transmission to another location, or is dropped for local distribution. As signals are dropped, the channels corresponding to those dropped signals are free to accept new signals. The new signals are uploaded into the WDM signal at the same wavelength as the signal that was dropped. Maintaining an active signal in each channel maximizes total bandwidth. Optical devices are often used to provide the switching within an OADM. Exemplary optical devices, and methods for making the same, are disclosed in U.S. Pat. Nos. 5,311,360, 5,841,579 and 5,808,797, issued to Bloom et al., and U.S. Pat. No. 6,268,952 issued to Godil et al., the contents of which are hereby incorporated by reference.

Dynamic gain equalization is also an aspect of WDM signal management. A variety of dynamic equalization techniques have been advanced, which seek to equalize component signals in a WDM system. Most rely on some spectral multiplexer/demultiplexer component, followed by an electrically-controllable variable optical attenuator which can operate on the de-multiplexed channels (or possibly a band of channels). Component signal intensity exiting the dynamic gain equalizer is set according to desired performance parameters, which may or may not require that all wavelengths have the same power. Light modulators are often used as the variable optical attenuator within a dynamic gain equalizer. Exemplary dynamic gain equalizers including optical devices are disclosed in U.S. application Ser. No. 10/051,972, filed on Jan. 15, 2002, and entitled "Method and Apparatus for Dynamic Equalization in Wavelength Division Multiplexing", the contents of which are hereby incorporated by reference.

Many applications require the equalization of the output spectrum as well as excellent extinction in the non-lit fibers. For example, switching input light from one channel to another can be achieved by diffracting the light into a first order of light, while reflecting very little light, ideally no light, as specularly reflected zero order light. The diffracted first order light in this case is then attenuated by controlled means, thereby equalizing the light that has been "switched" into the first order. It is common practice to perform the switching and equalizing functions at the same physical location for convenience, maintenance, and economic advantages. Switching and equalization together is performed by a wavelength selective switch and equalizer (WSSE).

FIG. 1 illustrates an exemplary operational schematic of a conventional 1×2 WSSE 5. The input signal IN comprises three component wavelength signals λ1, λ2 and λ3. In this case, the component wavelength signal 12 is switched to OUT2, the component wavelength signals λ1 and 13 are switched to OUT1 and the component wavelength signals λ1 and λ3 are equalized to the same level as component wavelength signal λ2.

FIG. 2 illustrates a functional schematic of the 1×2 WSSE 5 illustrated in FIG. 1. The functional schematic of FIG. 2 illustrates the steps required to perform the operation illustrated in FIG. 1. To perform the operation illustrated in FIG. 1, two steps are required. First, the component wavelength signals λ1 and 13 are switched and equalized by a 1×2 WSSE 10 to Intermediate 1. However, to equalize the component wavelength signals λ1 and λ3, attenuated portions of the component wavelength signals λ1 and λ3 are directed to Intermediate 2. Therefore, it is then necessary to equalize Intermediate 2 to remove the attenuated portions of the component wavelength signals 11 and 13. Second, Intermediate 2 is equalized by a 1×1 wavelength selective equalizer (WSE) to eliminate the attenuated portions of the component wavelength signals λ1 and λ3. This results in the equalized component wavelength signal λ2 at OUT2.

In this case, the Intermediate 1 comprises the intended output of equalized component wavelength signals λ1 and λ3. Therefore, in this case, a 1×1 WSE 15 merely passes through Intermediate 1 as OUT1. However, it should be clear that 1×1 WSE 15 is necessary in the case where component wavelength signal λ2 is to be switched to OUT2 and equalized. This is due to when the component wavelength signal λ2 is equalized by the 1×2 WSSE 10, an attenuated portion of the component wavelength signal λ2 is directed to Intermediate 1. Intermediate 1 is then equalized by 1×1 WSE 15 to eliminate the attenuated portion of the component wavelength signal λ2. The 1×1 WSE 15 and 20 each include a light modulator to equalize the intermediate signals, Intermediate 1 and 2. It is understood that although the WSSE described in relation to FIGS. 1 and 2 relates to a 1×2 WSSE, the same process and functionality readily applies to a 1×N WSSE.

It is understood that other means for equalizing the intermediate signals are possible. Regardless of the nature of the other means for equalizing, it is inefficient to use the 1×2 WSSE 5 and the other means for equalizing to perform the switch and equalize functions.

What is needed is a wavelength signal switch and equalizer that is more efficient than the conventional two-step process. What is further needed is a more efficient wavelength selective switch and equalizer that is more easily produced, and produced at a reduced cost.

SUMMARY OF THE INVENTION

An embodiment of the present invention includes a device comprising a light modulator including a plurality of elements wherein each element is selectively operable such that the plurality of elements are dynamically configurable to combine selected ones of a plurality of grating periods such that selected portions of an incident light are directed into one or more distinct modes wherein each distinct mode corresponds to a grating period.

Another embodiment of the present invention includes a method of switching and equalizing an input signal. The method comprises selectively actuating each of a plurality of elements, and dynamically configuring the plurality of elements to combine selected ones of a plurality of grating periods. Selected portions of an incident light are directed into one or more distinct modes wherein each distinct mode corresponds to a grating period.

DETAILED DESCRIPTION OF THE EMBODIMENTS

The present invention overcomes the deficiencies of conventional wavelength signal switch and equalizer (WSSE) by combining the switching and equalizing functionality within a single diffractive light modulator. Preferably the diffractive light modulator is a grating light valve type device. The grating light valve type device includes a plurality of elements, preferably elongated ribbons, that are selectively operable to be configured into combinations of patterns such that an incident light beam, or input signal, can be diffracted into multiple orders of light simultaneously. Such pattern combinations are comprised of component order patterns, where each component order pattern corresponds to a specific grating period. Each component order pattern diffracts light into a distinct diffraction angle. Each component pattern is defined by a distinct configuration of the plurality of ribbon elements. For example, an input signal can be entirely directed into the first order light by configuring the plurality of ribbon elements into a first order pattern. Multiple order patterns can be combined into a combined order pattern to direct the input signal into multiple orders simultaneously. Each order of light can be separately collected. Preferably, all orders of light are collected, except the highest order, as separate output channels. The highest order light is preferably not collected and is used as a channel to "throw away" light. Since the combined order pattern includes the component order patterns, the ribbon elements corresponding to the component order pattern of the highest order light can be selectively moved to adjust the amount of the input signal that is thrown away. As more of the input signal is thrown away, less of the input signal is directed to the collected channels corresponding to the lower orders of light. Conversely, as less of the input signal is thrown away, more of the input signal is directed to the collected channels. In this manner, the input signal is directed, or switched, to the desired output channels as output signals, while the intensity of the output signals is adjusted, or equalized, by "throwing away" a portion of the input signal into the highest order.

Figure 3:
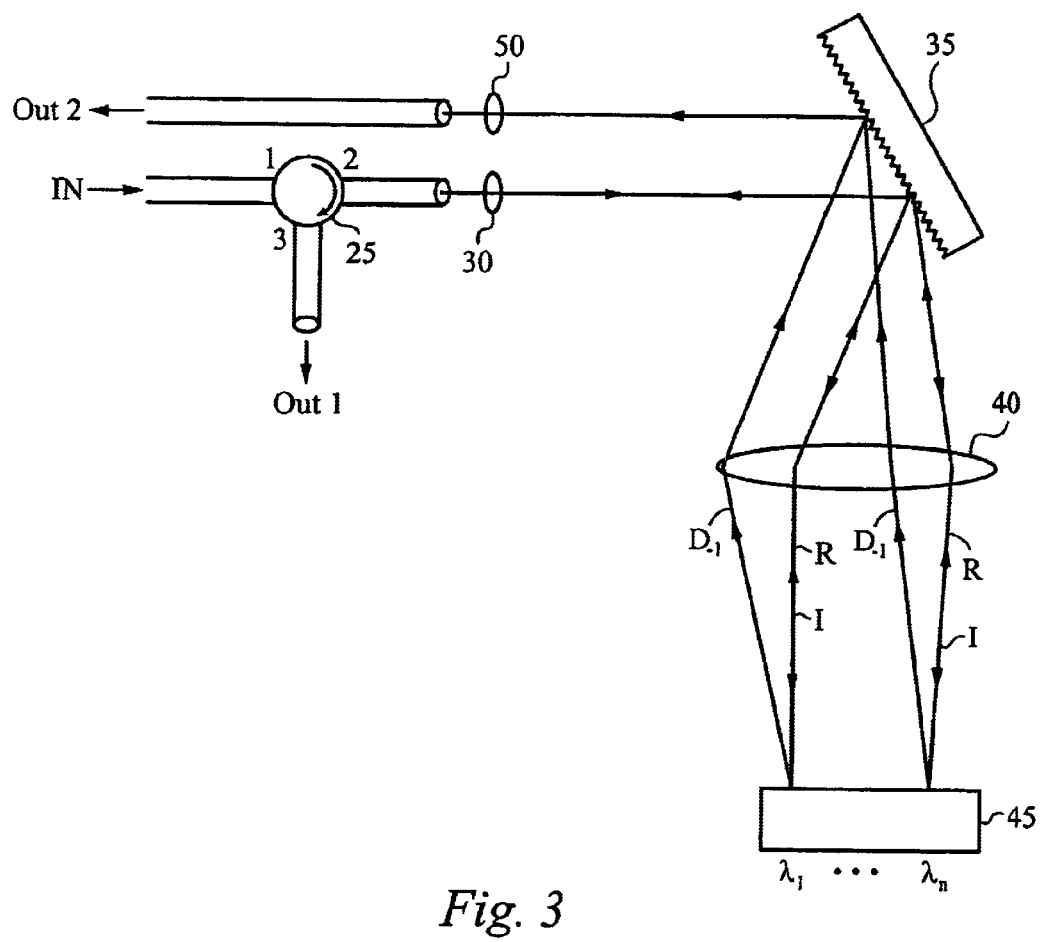
FIG. 3 illustrates a 1×2 WSSE according to the preferred embodiment of the present invention.

FIG. 3 illustrates a 1×2 wavelength selective switch and equalizer (WSSE) according to the preferred embodiment of the present invention. A WDM input signal IN is input at port 1 of a circulator 25. The circulator 25 directs the input signal IN out of port 2 to a collimating lens 30, which directs the collimated signal IN to a bi-directional diffractive grating 35, where component wavelengths of the signal IN are diffracted at different angles. Although a diffractive grating is preferably used to de-multiplex the signal IN into component wavelengths, alternate means can be used, including but not limited to a prism, a de-multiplexer, a bi-directional multiplexer/de-multiplexer, or an array waveguide. A transform lens 40 maps the component wavelengths onto different positions of a diffractive light modulator 45. Preferably, the diffractive light modulator 45 is a grating light valve type device onto which each component wavelength is mapped. Each component wavelength, represented in FIG. 3 as incident light I, is mapped to a predetermined portion of the grating light valve type device 45. The grating light valve type device 45 is an addressable dynamic diffraction grating. By adjusting the amount of diffraction, the reflected intensity can be controlled accurately over a large dynamic range. A reflected light R returns along the same path into port 2 of the circulator 25, which directs the reflected light R out of port 3 as output signal OUT1.

Figure 4:
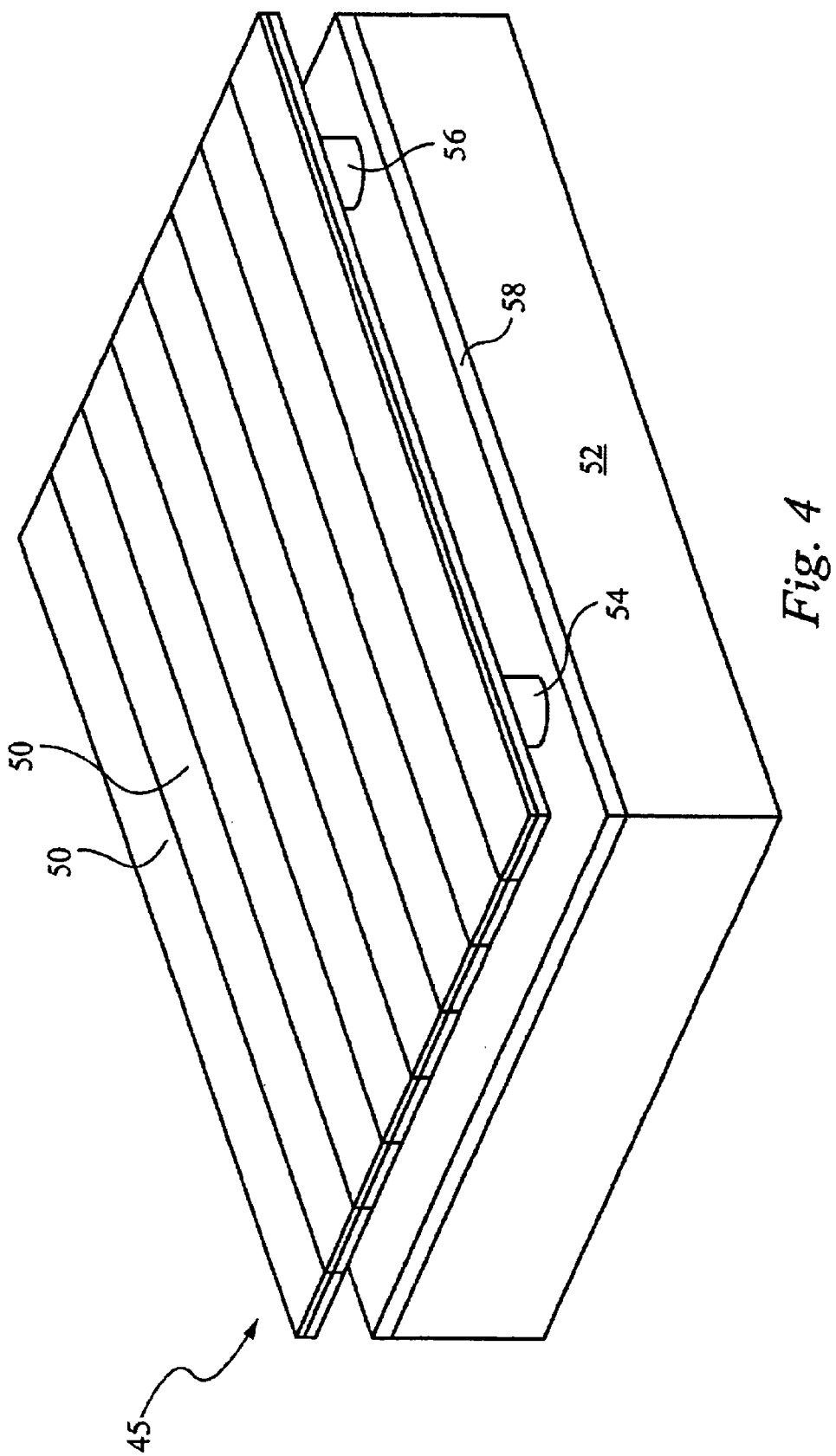
FIG. 4 illustrates an embodiment of a grating light valve type device of a wavelength signal switch and equalizer of the present invention.

FIG. 4 illustrates the grating light valve type device 45 according to the preferred embodiment of the present invention. The grating light valve type device 45 preferably comprises elongated elements 50 suspended by first and second posts, 54 and 56, above a substrate 52. The substrate 52 comprises a conductor 58. In operation, the grating light valve type device 45 operates to produce modulated light selected from a reflection mode and a diffraction mode.

Figure 5:
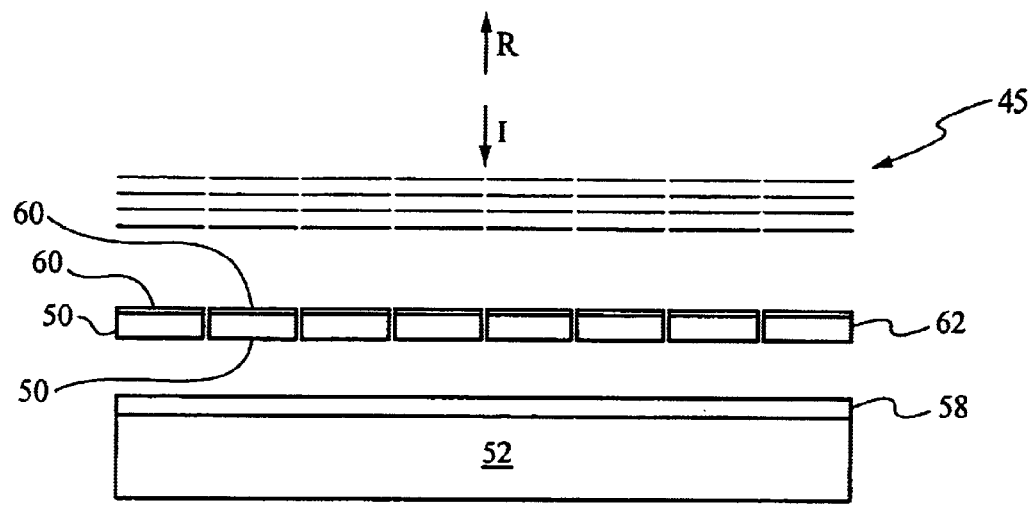
FIG. 5 illustrates a cross-section of the grating light valve type device in a reflection mode.
Figure 6:
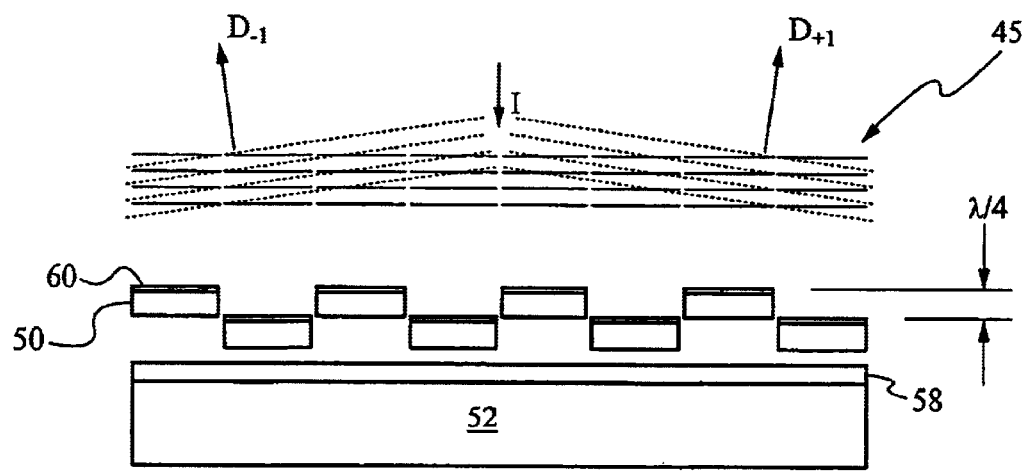
FIG. 6 illustrates a cross-section of the grating light valve type device in a diffraction mode.

FIGS. 5 and 6 illustrate a cross-section of the grating light valve type device 45 in the reflection mode and the diffraction mode, respectively. The elongated elements 50 comprise a conducting and reflecting surface 60 and a resilient material 62. The substrate 52 comprises the conductor 58.

It will be readily apparent to one skilled in the art that the conducting and reflecting surface 60 can be replaced by a multilayer dielectric reflector and a conducting element where the conducting element is buried within each of the elongated elements 50 or within just the alternate ones of the elongated elements 50. Further, it will be readily apparent to one skilled in the art that the conducting and reflecting surface 60 can be coated with a transparent layer such as an anti-reflective layer.

FIG. 5 depicts the grating light valve type device 45 in the reflection mode. In the reflection mode, the conducting and reflecting surfaces 60 of the elongated elements 50 form a plane so that incident light I reflects from the elongated elements 50 to produce reflected light R.

FIG. 6 depicts the grating light valve type device 45 in the diffraction mode. In the diffraction mode, an electrical bias causes alternate ones of the elongated elements 50 to move toward the substrate 52. The electrical bias is applied between the reflecting and conducting surfaces 60 of the alternate ones of the elongated elements 50 and the conductor 58. The electrical bias results in a height difference between the alternate ones of the elongated elements 50 and non-biased ones of the elongated elements 50. A height difference of a quarter wavelength $\lambda/4$ of the incident light I produces maximum diffracted light including plus one and minus one diffraction orders, $D_{+1}$ and $D_{-1}$.

FIGS. 5 and 6 depict the grating light valve type device 45 in the reflection and diffraction modes, respectively. For a deflection of the alternate ones of the elongated elements 50 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements by less than the quarter wavelength $\lambda/4$, the grating light valve type device 45 produces a variable reflectivity. By varying the reflectivity in this manner, each wavelength can be equalized to a specified intensity. It should be born in mind that terns like "equalize" and "equalization" as used with respect to the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies.

While FIGS. 4–6 depict the grating light valve type device 45 having eight of the elongated elements 50, the grating light valve type device 45 preferably includes more of the elongated elements 50. By providing more of the elongated elements 50, the elongated elements 50 are able to function as groups, which are referred to as pixels. Preferably, the pixels are groups of eight of the elongated elements 50 when the grating light valve type device 45 is used in a 1×2 WSSE. Alternatively, the pixels are groups of more or less elongated elements 50.

It will be readily apparent to one skilled in the art that the term "pixel" is used here in the context of an element of a light modulator rather than its more specific definition of a picture element of a display.

Referring back to FIG. 3, as each component wavelength impinges the grating light valve type device 45, the ribbon elements corresponding to that particular wavelength cause all, some, or none of the impinging component wavelength to diffract. A characteristic of diffraction is that a certain amount of the impinging light is "thrown away" from the central, or reflective, path. In essence, each component wavelength is dynamically equalized by discarding all, some or none of the signal by diffraction. As the ribbon elements are deflected, the component wavelength mapped to those ribbon elements is diffracted by an amount corresponding to the distance that the ribbon elements are deflected. When the ribbon elements are alternately deflected by a quarter wavelength of the incident component wavelength $\lambda$, maximum diffraction is achieved and the component wavelength is diffracted into the first order as first order light $D_{+1}$ and $D_{-1}$. For each component wavelength signal that is diffracted into the first order, the first order light is directed by the transform lens 40 to the diffractive grating 35. The diffractive grating 35 re-multiplexes all first order component signals into an output signal OUT2 and directs the signal OUT2 to a collimating lens 50. The collimating lens 50 directs the signal OUT2 to an output fiber. Preferably, only one of the first order light $D_{+1}$ and $D_{-1}$ is directed to the diffraction grating 35 and re-multiplexed into output signal OUT2. Alternatively, both first order light $D_{+1}$ and $D_{-1}$ are directed to the diffraction grating 35 and re-multiplexed into output signal OUT2. As illustrated in FIG. 3, two of the component wavelengths, $\lambda 1$ and $\lambda n$, are shown impinging the grating light valve type device 45. This is for illustrative purposes only and it is understood that other component wavelengths also impinge the grating light valve type device 45. It should also be understood that the transform lens 40 can also comprise more than one lens to direct each component wavelength signal to the proper location on the grating light valve type device 45 and to direct the first order light to the diffraction grating 35.

When the ribbon elements are not deflected, and instead remain in a flat, or mirror state, the impinging component wavelength signal is reflected back along its same path as a reflected component wavelength signal. The reflected component wavelength signal is the same as the reflected signal R. The reflected signal R is directed by the transform lens 40 to the diffractive grating 35. The diffractive grating 35 re-multiplexes all reflected component wavelength signals into an output signal OUT1 and directs the signal OUT1 to the collimating lens 30. The collimating lens 30 directs the signal OUT1 to the port 2 of the circulator 25, which directs signal OUT1 out of port 3 to a second output fiber.

When the ribbon elements of the grating light valve type device 45 are either in the mirror state, as in FIG. 5, or are alternatively deflected by a distance $\lambda/4$, as in FIG. 6, the apparatus illustrated in FIG. 3 acts as a 1×2 switch. In the mirror state, the component wavelength signal is directed to the first output fiber as OUT1. In the maximum deflected state at $\lambda/4$, the component wavelength signal is diffracted into the first order and subsequently directed to the second output fiber as OUT2. In this manner, the apparatus acts a wavelength selective switch. The input signal IN is directed to either OUT1 or OUT2.

Alternatively, the component wavelength signal can be equalized by alternatively deflecting the ribbon elements by a distance less than $\lambda/4$. A portion of the impinging component wavelength signal is reflected back as a reflected component wavelength signal and the remaining portion is diffracted into the first order as first order light. The farther the ribbon elements are deflected from the mirror state toward the maximum diffraction distance of $\lambda/4$, the greater the portion of the component wavelength signal diffracted into first order light. If the reflected component wavelength signal is to be collected, the reflected component wavelength signal can be equalized to a desired level by throwing away a portion of the impinging component wavelength signal into the first order. The amount of the impinging component wavelength signal that is thrown away is determined by the distance that the alternating ribbon elements are deflected. In this manner, the reflected component wavelength signals can be dynamically equalized.

Figure 1:
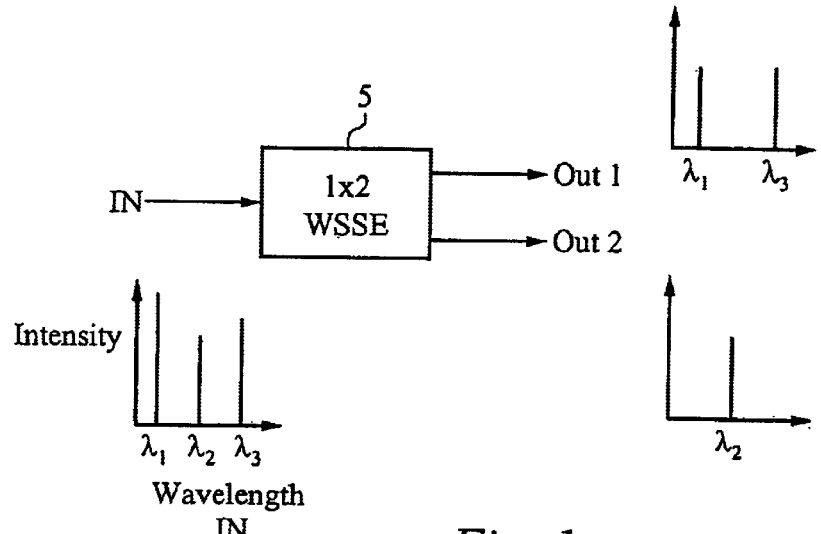
FIG. 1 illustrates an exemplary operational schematic of a conventional 1×2 wavelength signal switch and equalizer (WSSE).
Figure 2:
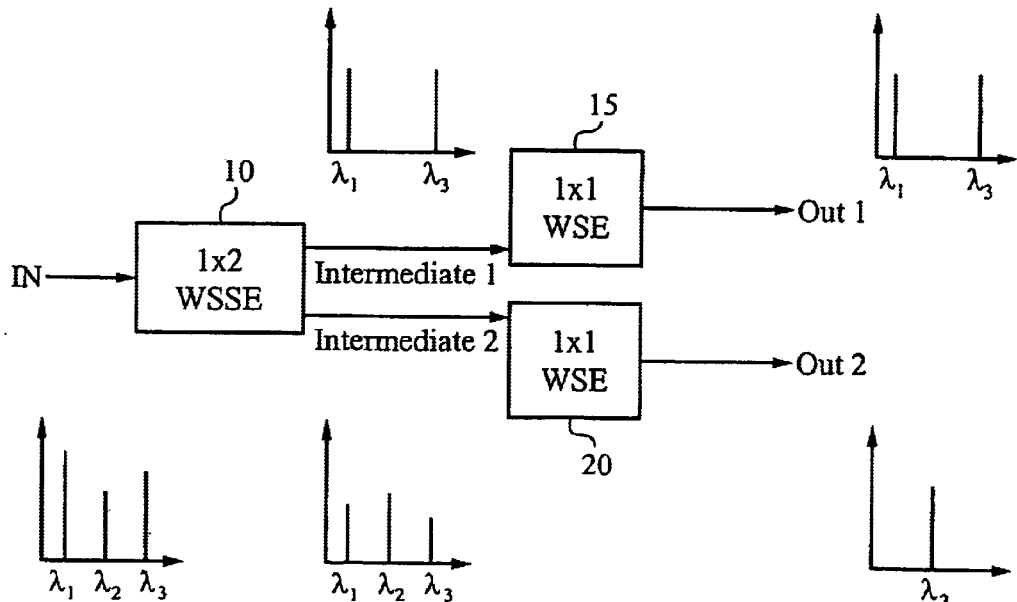
FIG. 2 illustrates a functional schematic of the 1×2 WSSE illustrated in FIG. 1.

By actuating alternating ribbons as described above, the WSSE illustrated in FIG. 3 functions effectively as either a switch or as a dynamic equalizer. Consider applying the input signal IN illustrated in FIG. 2 to the WSSE illustrated in FIG. 3. The input signal IN comprises the three component wavelength signals $\lambda 1$, $\lambda 2$ and $\lambda 3$. In this case, the component wavelength signal $\lambda 2$ is switched to OUT2, the component wavelength signals $\lambda 1$ and $\lambda 3$ are switched to OUT1 and the component wavelength signals $\lambda 1$ and $\lambda 3$ are equalized to the same level as component wavelength signal $\lambda 2$. To switch the component wavelength signal $\lambda 2$ to OUT2, which corresponds to collecting the first order light, the corresponding ribbon elements are deflected a maximum diffraction distance $(\lambda 2)/4$. To switch the component wavelength signals $\lambda 1$ and $\lambda 3$ to OUT1, which corresponds to collecting the zero order light, the corresponding ribbon elements are in the mirror state. However, in the mirror state, neither of the component wavelength signals $\lambda 1$ and $\lambda 3$ are equalized to the level of component wavelength signal $\lambda 2$, as desired. To attenuate the desired amount of component wavelength signals $\lambda 1$ and $\lambda 3$, the corresponding ribbon elements are deflected somewhere between the mirror state and the maximum diffraction state. This produces the component wavelength signals $\lambda 1$ and $\lambda 3$ equalized to the desired level at OUT1. However, although this attenuates the specularly reflected component wavelength signals $\lambda 1$ and $\lambda 3$ to the desired level for the zero order light which is collected as OUT1, a portion of the component wavelength signals $\lambda 1$ and $\lambda 3$ are also diffracted as first order light, which is collected as OUT2. Since only the component wavelength signal 12 is to be output at OUT2, the portion of component wavelength signals $\lambda 1$ and $\lambda 3$ at OUT2 must be extinguished.

Conventionally, the portions of component wavelength signals $\lambda 1$ and $\lambda 3$ to be extinguished are directed to a second grating light valve type device. The second grating light valve type device ribbon elements corresponding to the component wavelength signals $\lambda 1$ and $\lambda 3$ are actuated to provide maximum diffraction, thereby diffracting the component wavelength signals $\lambda 1$ and $\lambda 3$ into the first order. By collecting only the zero order light of the second grating light valve type device, the portions of the component wavelength signals $\lambda 1$ and $\lambda 3$ are effectively extinguishes from OUT2.

To summarize the conventional method, if a component wavelength signal is switched to OUT2 and equalized, then a portion of the component wavelength signal is "thrown away" into the zero order when the switched component wavelength signal is equalized. If this zero order portion is not extinguished, it will be output in OUT1. To extinguish this zero order portion, the zero order portion must be directed to a second grating light valve type device where it is extinguished by diffraction into the first order. It is understood that other means for extinguishing the zero order portion are possible. Regardless of the nature of the other means for extinguishing the zero order portion, it is inefficient to use the grating light valve type device 45 and the other means for extinguishing to perform the switch and equalize functions. The present invention eliminates the use of the second grating light valve type device by utilizing multiple orders of light including the zero order, the first order, and higher orders.

A diffraction angle of the first order light is determined by a grating period, which is the sum of the width of the gap between adjacent ribbon elements and the width of the ribbon element. In general, a diffraction angle $\theta$ can be determined using the grating formula, which in air, assuming normal incidence of the incident light on the grating light valve type device, says:

$(2\pi/\lambda)\sin(\theta) = 2\pi/\Lambda$ where $\lambda$ is the wavelength of the incident light in air, and $\Lambda$ is the grating period. Since the gap width is significantly smaller than the ribbon element width, the ribbon pitch is primarily determined by the ribbon element width. The smaller the grating period the greater the diffraction angle of the diffracted light. Since the grating period can be varied, the diffraction angle of the first order of light, and for that matter any order of light, is relative. Within the present invention, multiple orders of light are utilized. For example, first order, second order, third order, etc. Herein, the first order of light refers to that order of diffracted light with the smallest diffraction angle, the second order of light refers to the order of light with the next smallest diffraction angle, and so on.

As discussed above, conventional grating light valve type devices deflect alternating ribbon elements to diffract the component wavelength signals into first order light. This alternating ribbon pattern is illustrated in FIG. 6. Since the grating period is fixed, the types of attenuation profiles that can be imparted by the alternating ribbon pattern are limited. The present invention enables the grating light valve type device to dynamically adjust the grating period while maintaining the ability to deflect selectable ribbon elements. As such, multiple attenuation profiles can be superimposed, thereby diffracting a component wavelength signal into multiple orders simultaneously. This permits switching and equalizing to be performed by a single grating light valve type device.

To vary the grating period, various component order patterns can be used. Each component order pattern corresponds to a specific grating period, and diffracts light into a distinct diffraction angle. Light diffracted into a particular diffraction angle is also referred to as a particular order of light. Each component order pattern is defined by a distinct configuration of the individual ribbon elements. Two or more of these component order patterns are combined to scatter the component wavelength signal into two or more orders simultaneously. The highest order is used as a "throw away" channel, while the remaining lower orders act as output channels of the switch. To switch the component wavelength signal to an output channel, the component wavelength signal is diffracted into the order corresponding to the desired output channel. Simultaneously, a portion of the component wavelength signal is diffracted into the highest order of light. When a component wavelength signal is equalized, a portion of that component wavelength signal is attenuated. The attenuated portion is the portion that is diffracted into the highest order. The attenuated portion is thrown away while the remaining portion of the component wavelength signal is diffracted into the output channel. In this manner, the component wavelength signal is switched to the proper output channel and equalized to the proper level.

The component wavelength signal can also be switched into more than one output channel at a time. For example, to switch the component wavelength signal into two output channels, a first and second portion of component wavelength signal are simultaneously diffracted into an order corresponding to a first of the output channels and another order corresponding to a second of the output channels, respectively. A third portion of the component wavelength signal can be diffracted into the highest order to equalize the first and second portions.

In the case where a component wavelength signal is switched to a single output channel and equalized, a component order pattern corresponding to that output channel and a component order pattern corresponding to the throw away channel are combined. Within this combined pattern, the ribbon elements that account for the throw away channel can be actuated in a range from 0 to about $\lambda/2$ to equalize the component wavelength signal as appropriate. The ribbon elements in the combined pattern that account for the desired output channel preferably remain fixed at positions corresponding to the component order pattern for the desired output channel, to switch the component wavelength signal into the appropriate output channel. Alternatively, the ribbon elements in the combined pattern that account for the desired output channel can be uniformly varied to provide additional attenuation and diffraction characteristics.

For ease of discussion, FIGS. 7–14 are described in reference to a single component wavelength signal. It is understood that the concepts described in regards to the component wavelength signal can be applied to a plurality of component wavelength signals, as in the case of a WDM signal.

Figure 7A:
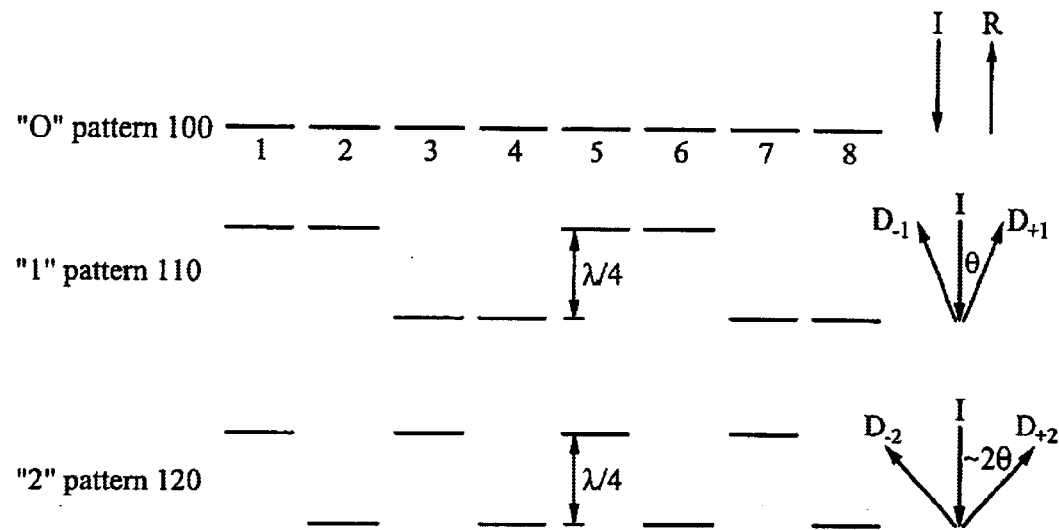
FIG. 7A illustrates exemplary ribbon element patterns to diffract a component wavelength signal into various orders of light.
Figure 8:
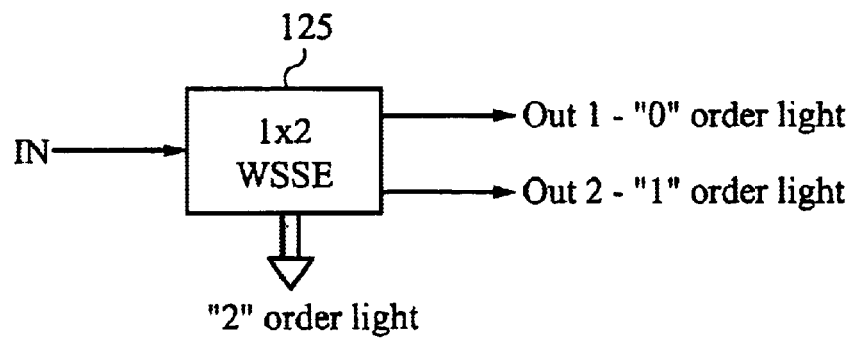
FIG. 8 illustrates an operational schematic of a 1×2 WSSE.

FIG. 7A illustrates exemplary component order patterns used to diffract a component wavelength signal into various orders of light. Component order patterns are also known as phase profiles. These component order patterns are produced by the grating light valve type device 45 within a 1×2 WSSE. Preferably, within a 1×2 WSSE, eight ribbon elements correspond to the component wavelength signal. Alternatively, more or less ribbon elements can correspond to the component wavelength signal as long as the ribbon elements can form sufficient number of component order patterns to produce at least three orders of light. An operational schematic of a 1×2 WSSE 125 is illustrated in FIG. 8. Signal IN is received by the 1×2 WSSE 125. Signal OUT1 includes all collected zero order light. Signal OUT2 includes all collected first order light. Second order light is preferably not collected. In other words, second order light is thrown away. In operation, the 1×2 WSSE 125 receives the component wavelength signal as input signal IN. The signal IN is equalized and directed to either OUT1 or OUT2. Signal IN is directed to OUT1 by appropriately reflecting signal IN and collecting the reflected zero order light. The signal IN is directed to OUT2 by appropriately diffracting the signal IN and collecting the first order light. The signal IN is equalized by diffracting an appropriate portion of the signal IN into the second order. Directing the signal IN into the zero order, the first order and the second order is accomplished by appropriately combining the component order patterns illustrated in FIG. 7A. The component order patterns include a "0" order pattern 100, a "1" order pattern 110, and a "2" order pattern 120. The quotation marks around the "0", "1" and "2" order patterns are used to indicate that these are relative terms. The diffraction angle of the "1" order pattern 110 and the diffraction angle of the "2" order patten are determined by their respective grating periods, as described above. If for example, the ribbon elements illustrated in FIG. 7A are one-half the ribbon width of the ribbon elements illustrated in FIG. 6, then the diffraction angles produced by the "1" order pattern 110 and the ribbon pattern in FIG. 6 are approximately the same. They are approximate due to the additional gaps in the "1" order pattern 110. This is in essence how the present invention dynamically adjusts the grating period. The first two ribbon elements in the "1" order pattern 110 effectively produce a grating period of approximately two times the ribbon element width, which produces the diffraction angle θ. The "2" order pattern 120 adjusts the grating period to approximately the ribbon element width, which produces a diffraction angel of approximately 2θ.

FIG. 7A shows one embodiment of different ribbon patterns and the resultant diffraction. Eight ribbons are shown, although the pattern could repeat to include more ribbons. If all ribbons are undeflected, as shown in the "0" pattern 100, the incident light I hits an essentially flat surface and is specularly reflected, as reflected light R, into the zero order. The reflected light R is reflected back into the fiber it came from, and diverted in a circulator into fiber Out 1, as shown in FIG. 8.

Figure 7B:
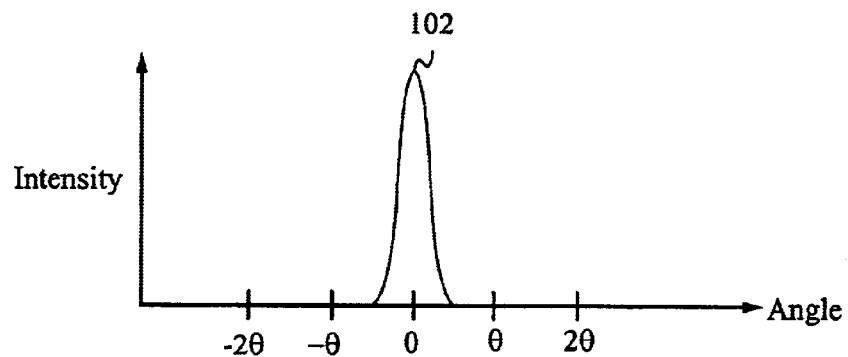
FIGS. 7B–7D illustrate exemplary diffraction angle versus intensity distribution curves for various component order patterns associated with a 1×2 WSSE.

FIG. 7B illustrates an exemplary diffraction angle versus intensity distribution curve resulting from signal IN impinging the "0" pattern 100 of FIG. 7A. As can be seen in FIG. 7B, signal IN diffracts according to a distribution curve 102 which is centered about a zero order diffraction angle.

If ribbons 3, 4, 7 and 8 are deflected by one quarter wavelength $\lambda/4$, as in the "1" pattern 110 in FIG. 7A, all of the incident light I is diffracted into the plus one and the minus one orders at about angle θ and −θ. The quarter-wavelength deflection of ribbons 3, 4, 7 and 8 cancels out the reflection into the zero order. The diffracted light $D_{+1}$ and $D_{-1}$ can be captured in a separate fiber and routed to port Out 2 (FIG. 8).

Figure 7C:
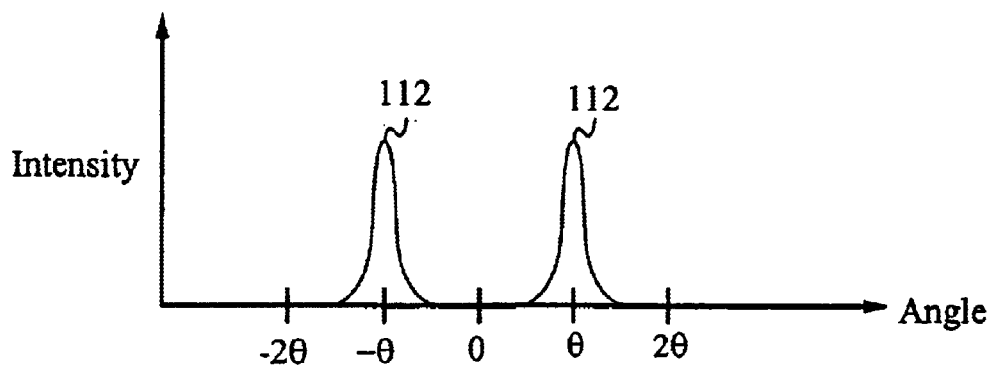

FIG. 7C illustrates an exemplary diffraction angle versus intensity distribution curve resulting from signal IN impinging the "1" pattern 110 of FIG. 7A. As can be seen in FIG. 7C, signal IN diffracts according to a distribution curve 112 which includes the plus and the minus first order diffraction centered about the plus first order diffraction angle θ and the minus first order diffraction angle −θ, respectively.

Similarly, as shown in the "2" pattern 120 of FIG. 7A, if ribbons 2, 4, 6 and 8 are deflected by $\lambda/4$, the incident light I is diffracted at approximately 2θ and −2θ. In this case, the diffracted light $D_{+2}$ and $D_{-2}$ is not collected in a fiber but rather is the destination for "unwanted" light.

Figure 7D:
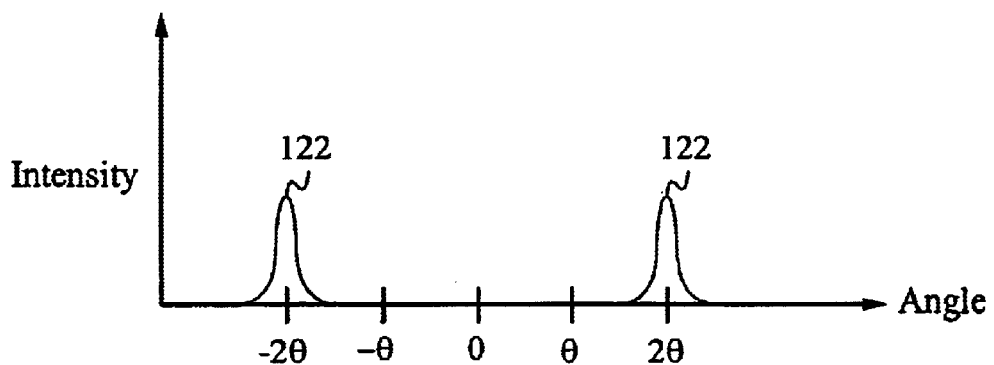

FIG. 7D illustrates an exemplary diffraction angle versus intensity distribution curve resulting from signal IN impinging the "2" pattern 120 of FIG. 7A. As can be seen in FIG. 7D, signal IN diffracts according to a distribution curve 122 which includes the plus and the minus second order diffraction centered about the plus second order diffraction angle 2θ and the minus second order diffraction angle −2θ, respectively.

It will be clear to someone skilled in the art that the diffraction pattern can be easily calculated by taking the Fourier transform of the ribbon pattern. See, for instance, "Introduction to Fourier Optics", by J. W. Goodman (McGraw-Hill, 1968). In the cases shown in FIG. 7A, there is essentially only one Fourier component to the pattern of ribbon deflections, hence only one set of diffraction angles is exhibited. However, Fourier analysis can be easily used in the case of a more complicated ribbon pattern. One such ribbon pattern is shown in FIG. 9A.

Figure 9A:
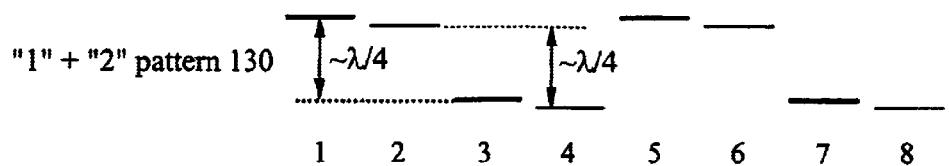
FIG. 9A illustrates an exemplary "1"+"2" order pattern used by the 1×2 WSSE illustrated in FIG. 8.
Figure 9B:
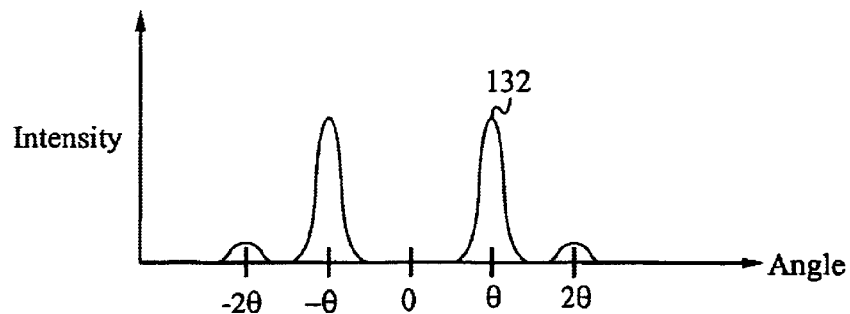
FIG. 9B illustrates an exemplary diffraction angle versus intensity distribution curves for a combined order pattern associated with a 1×2 WSSE.
Figure 10:
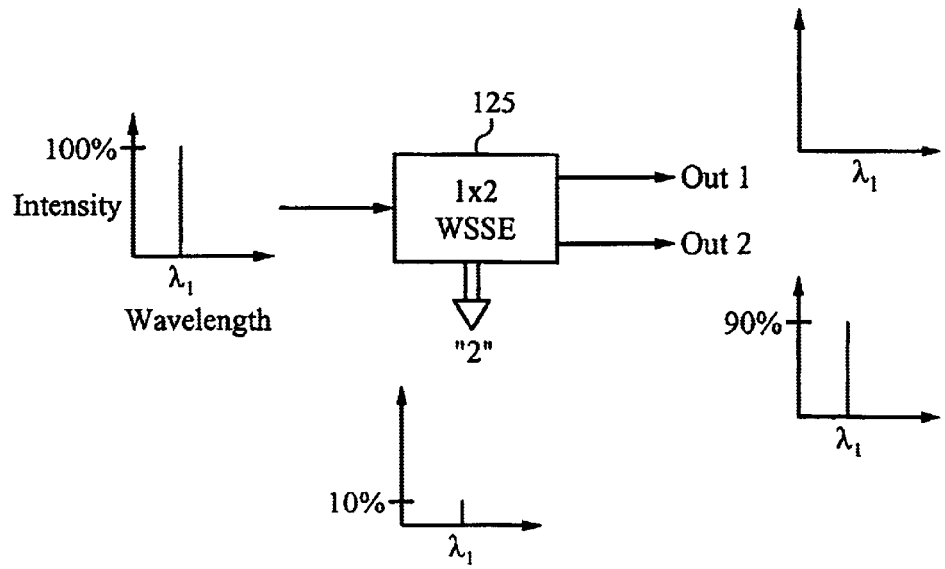
FIG. 10 illustrates the operation schematic of the 1×2 WSSE illustrated in FIG. 8 and the corresponding signal characteristic curves.

FIGS. 9A, 9B and 10 illustrate an exemplary application of the 1×2 WSSE 125. In this case, it is desired that an input component wavelength signal $\lambda 1$ is switched to OUT2. As described above, OUT2 corresponds to collected "1" order light. It is also desired that the input component wavelength signal $\lambda 1$ is equalized to a level 90% of its input intensity. To accomplish this, a combined order pattern is used. The combined order pattern combines the "1" order pattern 110 to switch the input signal $\lambda 1$ to OUT2, and the "2" order pattern 120 to diffract 10% of the input signal $\lambda 1$ into the second order, thereby diffracting 90% of the input signal $\lambda 1$ into the first order.

FIG. 9A illustrates the combined order pattern related to FIG. 10 as "1"+"2" pattern 130, where the "1" pattern 110 is combined with a small component of the "2" pattern 120. Ribbons 2, 4, 6 and 8 are pulled down slightly from the position they would have held in a pure "1"pattern 110. This introduces some of the "2" pattern 120, although much less than shown with full quarter-wavelength pulldown as in the "2" pattern 120 of FIG. 7A. This slight introduction of the "2" pattern 120 deflects some of the light that would have gone to the first order diffraction, as in the pure "1" pattern 110, into the second order diffraction. In this embodiment, this allows the diffraction of light into the first order output and into fiber Out 2 without specular reflection into the zero order. At the same time, some of the light is diffracted into the second order, thereby "equalizing" the intensity at Out 2.

In these circumstances the intensity of the light in the plus first order may not equal the intensity of light in the minus first order. Nonetheless, if both of those orders are collected in Out 2 the device shown in FIG. 8 acts as a simultaneous switch and equalizer.

FIG. 9B illustrates an exemplary diffraction angle versus intensity distribution curve resulting from signal IN impinging the "1"+"2" pattern 130 of FIG. 9A. As can be seen in FIG. 9B, signal IN diffracts according to a distribution curve 132 which includes a majority of signal IN diffracted into the plus and the minus first order diffraction angles θ and −θ, respectively, and a minority of signal IN diffracted into the plus and the minus second order diffraction angles 2θ and −2θ, respectively.

As the deflection of ribbons 2, 4, 6, and 8 is increased, the amount of light diffracted into the second order increases. At the same time, the deflection of ribbons 3 and 7 can be decreased. If ribbons 2, 4, 6 and 8 are deflected by one quarter wavelength, and ribbons 3 and 7 are moved up by a quarter wavelength from their position in the "1" pattern 110, the ribbons elements return to the "2" pattern 120. The "2" pattern 120 deflects light only into the second order, without any deflection into first or zero order. By maintaining the correct relationship between the deflection of ribbons 2, 4, 6 and 8 to the position of ribbons 3 and 7, light can be continuously diverted from the first order to the second order. This diverts light from output Out 2 (FIG. 8) to the "unwanted light" position, "2" order light (FIG. 8), and smoothly permits the equalization of the light in Out 2, while preventing coupling of light into Out 1 (FIG. 8). The correct positions for all of the ribbons can be easily determined from a Fourier analysis, as described above.

It is understood that the ribbon patterns 110 and 120 illustrated in FIG. 7A are for illustrative purposes only and should not be used to limit the scope of the present invention. It should be clear to those skilled in the art that alternative ribbon patterns can be used to produce "1" order and "2" order light. For example, the ribbon elements in "1" order pattern 110 can be flip-flopped such that the first, second, fifth and sixth ribbon elements are deflected λ/4 while the remaining ribbon elements are un-deflected.

It is also understood that component order pattern combinations other than a "1"+"2" order pattern can be applied to the 1×2 WSSE 125. For example, a "0"+"2" order pattern can be used to switch the input signal λ1 to OUT1 and to equalize the input signal λ1 to a desired level.

Figure 11A:
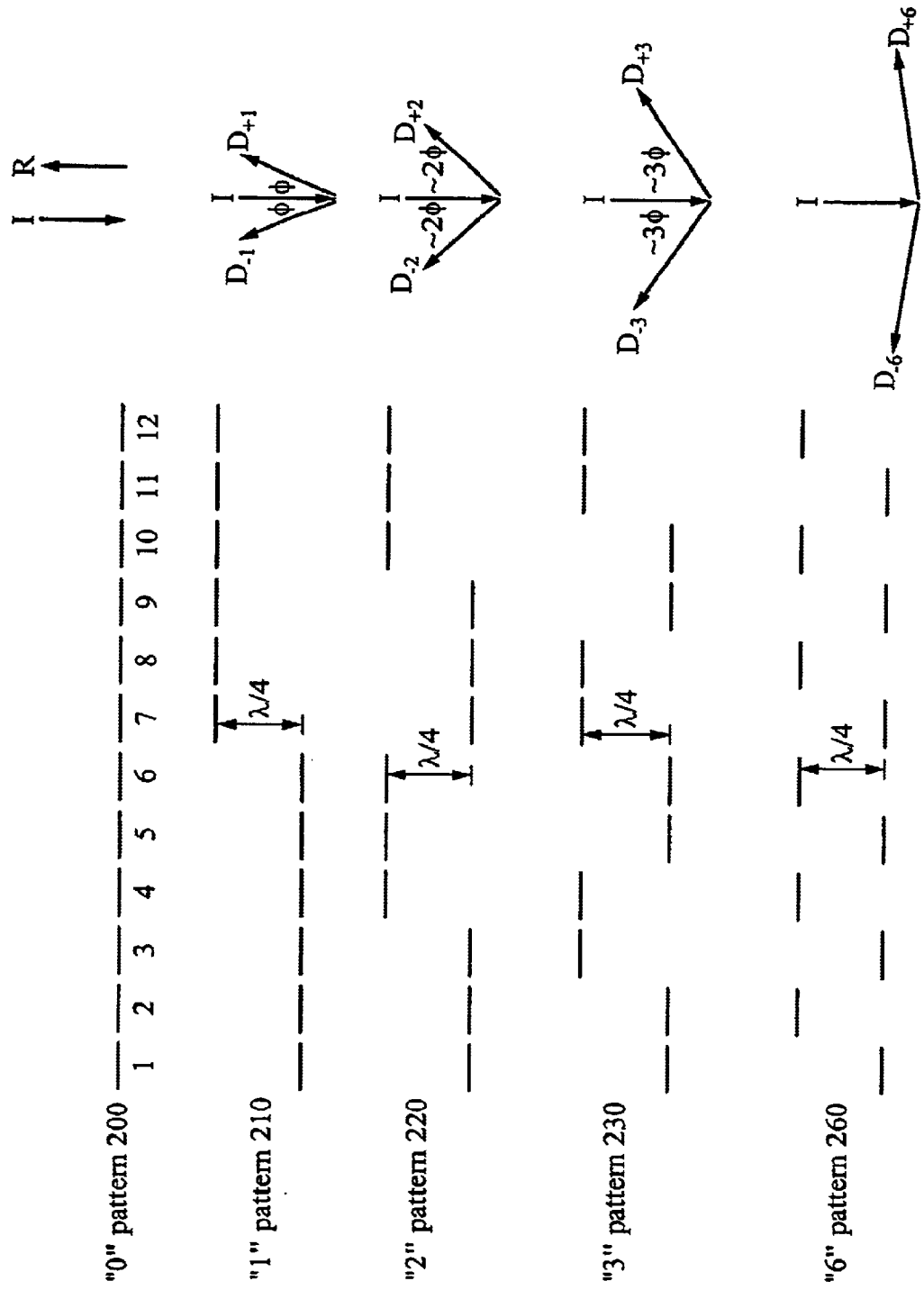
FIG. 11A illustrates exemplary ribbon element patterns to diffract a component wavelength signal into various orders of light.
Figure 12:
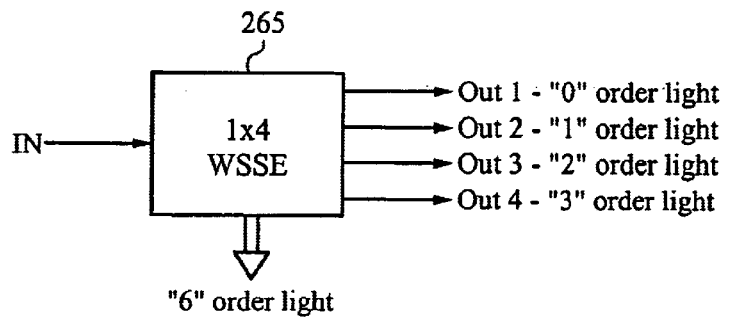
FIG. 12 illustrates an operational schematic of a 1×4 WSSE.

FIG. 11A illustrates exemplary component order patterns used within a 1×4 WSSE. These component order patterns are produced by a grating light valve type device within the 1×4 WSSE. Preferably, within the 1×4 WSSE, twelve ribbon elements correspond to each component wavelength signal. Alternatively, more or less ribbon elements can correspond to each component wavelength signal as long as the ribbon elements can form sufficient number of component order patterns to produce at least five orders of light. An operational schematic of a 1×4 WSSE 265 is illustrated in FIG. 12. Signal IN is received by the 1×4 WSSE 265. Signal OUT1 includes all collected zero order light. Signal OUT2 includes all collected first order light. Signal OUT3 includes all collected second order light. Signal OUT4 includes all collected third order light. Sixth order light is preferably not collected. In other words, sixth order light is thrown away. In operation, the 1×4 WSSE 265 receives the component wavelength signal as input signal IN. The signal IN is equalized and directed to either OUT1, OUT2, OUT3 or OUT4. Signal IN is directed to OUT1 by appropriately reflecting signal IN and collecting the reflected zero order light. The signal IN is directed to OUT2 by appropriately diffracting the signal IN and collecting the first order light. The signal IN is directed to OUT3 by appropriately diffracting the signal IN and collecting the second order light. The signal IN is directed to OUT4 by appropriately diffracting the signal IN and collecting the third order light. The signal IN is equalized by diffracting an appropriate portion of the signal IN into the sixth order. Directing the signal IN into the zero order, the first order, the second order, the third order and the sixth order is accomplished by appropriately combining the component order patterns illustrated in FIG. 11A. The component order patterns include a "0" order pattern 200, a "1" order pattern 210, a "2" order pattern 220, a "3" order pattern 230, and a "6" order pattern 260. The quotation marks around the "0", "1", "2", "3", and "6" order patterns are used to indicate that these are relative terms. The diffraction angles of the "1" order pattern 210, the "2" order patten 220, the "3" order pattern 230, and the "6" order pattern 260 are determined by their respective grating periods, as described above. If for example, the ribbon elements illustrated in FIG. 11A are one-half the ribbon width of the ribbon elements illustrated in FIG. 6, then the diffraction angles produced by the "3" order pattern 230 and the ribbon pattern in FIG. 6 are approximately the same. They are approximate due to the additional gaps in the "3" order pattern 230.

The first six ribbon elements in the "1" order pattern 210 effectively produce a grating period of approximately six times the ribbon element width, which produces the diffraction angle φ. The "2" order pattern 220 adjusts the grating period to approximately three times the ribbon element width, which produces a diffraction angel of approximately 2φ. The "3" order pattern 230 adjusts the grating period to approximately two times the ribbon element width, which produces a diffraction angel of approximately 3φ.

FIG. 11A shows one embodiment of different ribbon patterns and the resultant diffraction. Twelve ribbons are shown, although the pattern could repeat to include more ribbons. If all ribbons are undeflected, as shown in the "0" pattern 200, the incident light I hits an essentially flat surface and is specularly reflected, as reflected light R, into the zero order. The reflected light R is reflected back into the fiber it came from, and diverted in a circulator into fiber Out 1, as shown in FIG. 12.

Figure 11B:
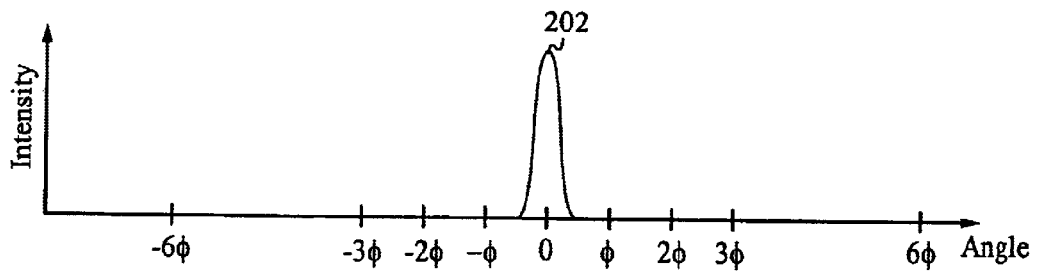
FIGS. 11B–11F illustrate exemplary diffraction angle versus intensity distribution curves for various component order patterns associated with a 1×4 WSSE.

FIG. 11B illustrates an exemplary diffraction angle versus intensity distribution curve resulting from signal IN impinging the "0" pattern 200 of FIG. 11A. As can be seen in FIG. 11B, signal IN diffracts according to a distribution curve 202 which is centered about a zero order diffraction angle.

If ribbons 1–6 are deflected by one quarter wavelength λ/4, as in the "1" pattern 210 in FIG. 11A, all of the incident light I is diffracted into the plus one and the minus one orders at about angle φ and −φ. The quarter-wavelength deflection of ribbons 1–6 cancels out the reflection into the zero order.

The diffracted light $D_{+1}$ and $D_{-1}$ can be captured in a separate fiber and routed to port Out 2 (FIG. 12).

Figure 11C:
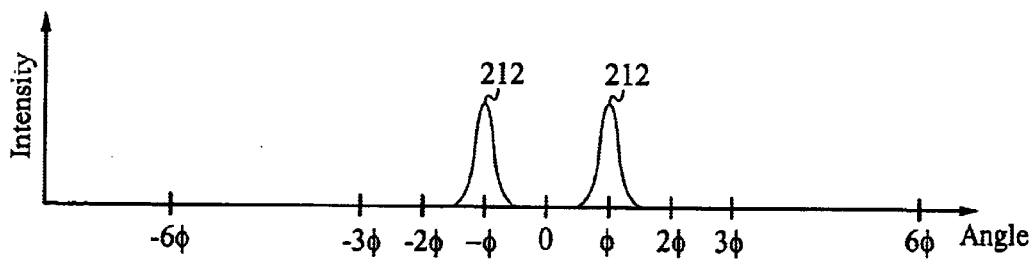

FIG. 11C illustrates an exemplary diffraction angle versus intensity distribution curve resulting from signal IN impinging the "1" pattern 210 of FIG. 11A. As can be seen in FIG. 11C, signal IN diffracts according to a distribution curve 212 which includes the plus and the minus first order diffraction centered about the plus first order diffraction angle $\phi$ and the minus first order diffraction angle $-\phi$, respectively.

If ribbons 1–3 and 7–9 are deflected by one quarter wavelength $\lambda/4$, as in the "2" pattern 220 in FIG. 11A, all of the incident light I is diffracted into the plus two and the minus two orders at about angle $2\phi$ and $-2\phi$. The quarter-wavelength deflection of ribbons 1–3 and 7–9 cancels out the reflection into the zero order. The diffracted light $D_{+2}$ and $D_{-2}$ can be captured in a separate fiber and routed to port Out 3 (FIG. 12).

Figure 11D:
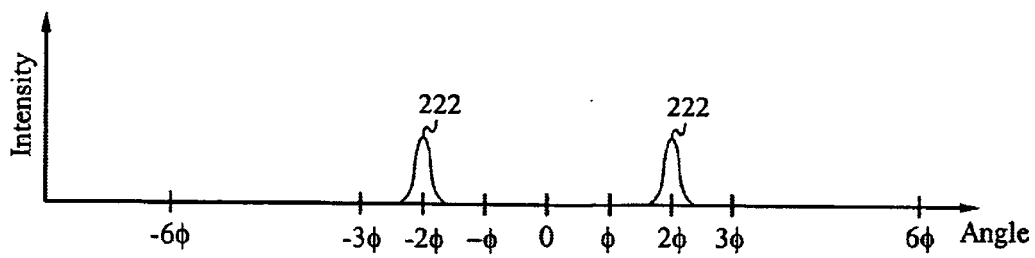

FIG. 11D illustrates an exemplary diffraction angle versus intensity distribution curve resulting from signal IN impinging the "2" pattern 220 of FIG. 11A. As can be seen in FIG. 11D, signal IN diffracts according to a distribution curve 222 which includes the plus and the minus second order diffraction centered about the plus second order diffraction angle $2\phi$ and the minus second order diffraction angle $-2\phi$, respectively.

If ribbons 1, 2, 5, 6, 9, and 10 are deflected by one quarter wavelength $\lambda/4$, as in the "3" pattern 230 in FIG. 11A, all of the incident light I is diffracted into the plus three and the minus three orders at about angle $3\phi$ and $-3\phi$. The quarter-wavelength deflection of ribbons 1, 2, 5, 6, 9, and 10 cancels out the reflection into the zero order. The diffracted light $D_{+3}$ and $D_{-3}$ can be captured in a separate fiber and routed to port Out 4 (FIG. 12).

Figure 11E:
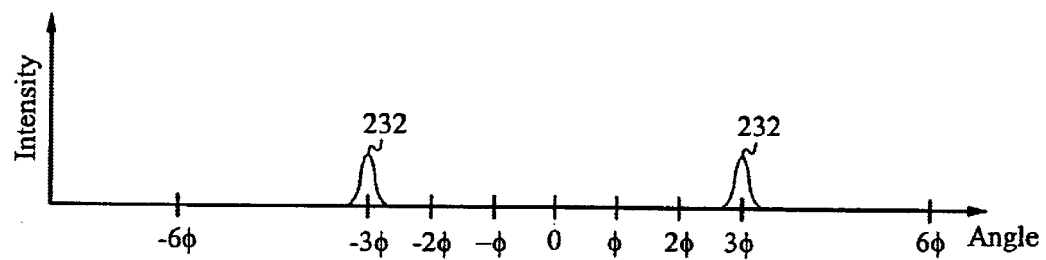

FIG. 11E illustrates an exemplary diffraction angle versus intensity distribution curve resulting from signal IN impinging the "3" pattern 230 of FIG. 11A. As can be seen in FIG. 11E, signal IN diffracts according to a distribution curve 232 which includes the plus and the minus third order diffraction centered about the plus third order diffraction angle $3\phi$ and the minus third order diffraction angle $-3\phi$, respectively.

Similarly, as shown in the "6" pattern 260 of FIG. 11A, if ribbons 1, 3, 5, 7, 9, and 11 are deflected by $\lambda/4$, the incident light I is diffracted at approximately $6\phi$ and $-6\phi$. In this case, the diffracted light $D_{+6}$ and $D_{-6}$ is not collected in a fiber but rather is the destination for "unwanted" light.

Figure 11F:
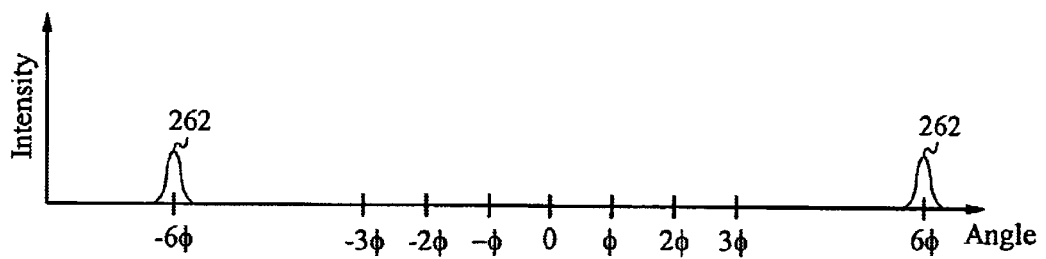

FIG. 11F illustrates an exemplary diffraction angle versus intensity distribution curve resulting from signal IN impinging the "6" pattern 260 of FIG. 11A. As can be seen in FIG. 11F, signal IN diffracts according to a distribution curve 262 which includes the plus and the minus sixth order diffraction centered about the plus sixth order diffraction angle $6\phi$ and the minus sixth order diffraction angle $-6\phi$, respectively.

From the perspective of the incident light I, the "1" order pattern 210 looks like two ribbon elements. The first ribbon element includes ribbon elements 1–6 and the second ribbon element includes ribbon elements 7–12. Similarly, the "2" order patter 220 looks like 4 ribbon elements to the incident light I, the "3" order pattern 230 looks like 6 ribbon elements, and the "6" order pattern 260 looks like 12 ribbon elements.

In the cases shown in FIG. 11A, there is essentially only one Fourier component to the pattern of ribbon deflections, hence only one set of diffraction angles is exhibited. However, Fourier analysis can be easily used in the case of a more complicated ribbon pattern. One such ribbon pattern is shown in FIG. 13A.

Figure 13A:
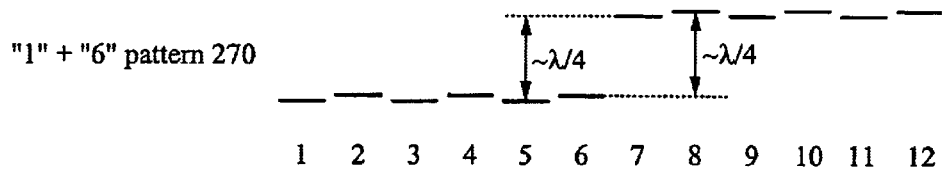
FIG. 13A illustrates an exemplary "1"+"6" order pattern used by the 1×4 WSSE illustrated in FIG. 12.
Figure 13B:
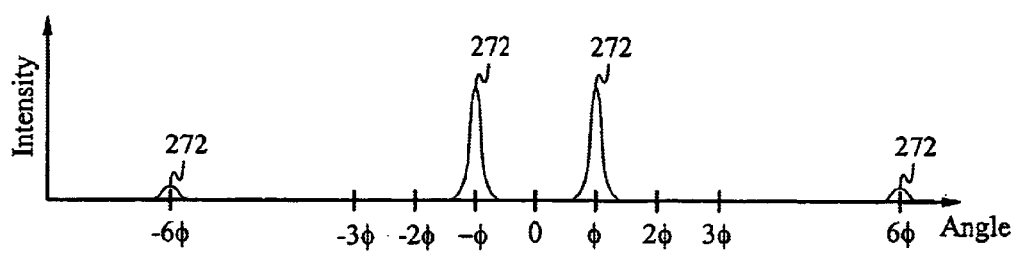
FIG. 13B illustrates an exemplary diffraction angle versus intensity distribution curves for a combined order pattern associated with a 1×4 WSSE.
Figure 14:
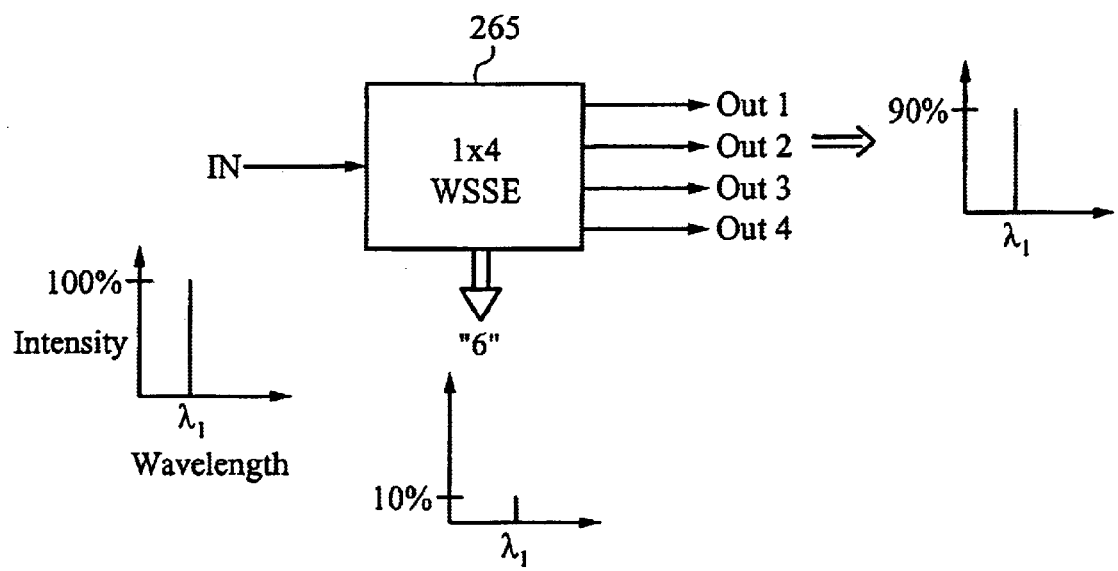
FIG. 14 illustrates the operation schematic of the 1×4 WSSE illustrated in FIG. 12 and the corresponding signal characteristic curves.

FIGS. 13A, 13B and 14 illustrate an exemplary application of the 1×4 WSSE 265. In this case, it is desired that an input component wavelength signal $\lambda 1$ is switched to OUT2. As described above, OUT2 corresponds to collected "1" order light. It is also desired that the input component wavelength signal $\lambda 1$ is equalized to a level 90% of its input intensity. To accomplish this, a combined order pattern is used. The combined order pattern combines the "1" order pattern 210 to switch the input signal $\lambda 1$ to OUT2, and the "6" order pattern 260 to diffract 10% of the input signal $\lambda 1$ into the "6" order, thereby diffracting 90% of the input signal $\lambda 1$ into the "1" order. The intensity levels of the input signal $\lambda 1$, the OUT2 signal $\lambda 1$, and the "6" order signal $\lambda 1$ are illustrated in FIG. 14.

FIG. 13A illustrates the combined order pattern related to FIG. 14 as "1"+"6" pattern 270, where the "1" pattern 210 is combined with a small component of the "6" pattern 260. Ribbons 1, 3, 5, 7, 9, and 11 are pulled down slightly from the position they would have held in a pure "1" pattern 210. This introduces some of the "6" pattern 260, although much less than shown with full quarter-wavelength pulldown as in the "6" pattern 260 of FIG. 11A. This slight introduction of the "6" pattern 260 deflects some of the light that would have gone to the first order diffraction, as in the pure "1" pattern 210, into the sixth order diffraction. In this embodiment, this allows the diffraction of light into the first order output and into fiber Out 2 without specular reflection into the zero order. At the same time, some of the light is diffracted into the sixth order, thereby "equalizing" the intensity at Out 2.

In these circumstances the intensity of the light in the plus first order may not equal the intensity of light in the minus first order. Nonetheless, if both of those orders are collected in Out 2 the device shown in FIG. 14 acts as a simultaneous switch and equalizer.

FIG. 13B illustrates an exemplary diffraction angle versus intensity distribution curve resulting from signal IN impinging the "1"+"6" pattern 270 of FIG. 13A. As can be seen in FIG. 13B, signal IN diffracts according to a distribution curve 272 which includes a majority of signal IN diffracted into the plus and the minus first order diffraction angles $\phi$ and $-\phi$, respectively, and a minority of signal IN diffracted into the plus and the minus sixth order diffraction angles $6\phi$ and $-6\phi$, respectively.

As the deflection of ribbons 1, 3, 5, 7, 9, and 11 are increased, the amount of light diffracted into the sixth order increases. At the same time, the deflection of ribbons 2, 4, and 6 can be decreased. If ribbons 1, 3, 5, 7, 9, and 11 are deflected by one quarter wavelength, and ribbons 2, 4, and 6 are moved up by a quarter wavelength from their position in the "1" pattern 210, the ribbons elements return to the "6" pattern 260. The "6" pattern 260 deflects light only into the sixth order, without any deflection into zero, first, second, or third order. By maintaining the correct relationship between the deflection of ribbons 1, 3, 5, 7, 9, and 11 to the position of ribbons 2, 4, and 6, light can be continuously diverted from the first order to the sixth order. This diverts light from output Out 2 (FIG. 14) to the "unwanted light" position, "6" (FIG. 14), and smoothly permits the equalization of the light in Out 2, while preventing coupling of light into Out 1, Out 3, or Out 4 (FIG. 14). The correct positions for all of the ribbons can be easily determined from a Fourier analysis, as described above.

It is understood that the order patterns 210, 220, 230, and 260 illustrated in FIG. 11A are for illustrative purposes only and should not be used to limit the scope of the present invention. It should be clear to those skilled in the art that alternative ribbon patterns can be used to produce "1" order, "2" order, "3" order and "6" order light. For example, the ribbon elements in "1" order pattern 210 can be flip-flopped such that the ribbon elements 7–12 are deflected λ/4 while the remaining ribbon elements are un-deflected.

It is also understood that component order pattern combinations other than a "1"+"6" order pattern can be applied to the 1×4 WSSE 265. For example, a "2"+"6" order pattern can be used to switch the input signal λ1 to OUT3 and to equalize the input signal λ1 to a desired level.

The diffraction angle versus intensity distribution curves illustrated in FIGS. 7B, 7C, 7D, 9B, 11B, 11C, 11D, and 13B show exemplary cases in which the intensity distribution is approximately the same between similar diffraction angles on the plus side and on the minus side. The distribution curves can also be unequal for similar diffraction angles such that the intensity level of the plus diffraction angle is greater than or less than the intensity of the corresponding minus diffraction angle. Such an inequality can be accounted for by collecting both the plus and the minus orders of diffracted light. Alternatively, WSSEs of the present invention can be designed to intentionally diffract a majority of light into a single plus or minus diffraction angle, in which case, only the single order of light is preferably collected.

Although the concepts of the present invention have been explained in relation to a 1×2 WSSE and a 1×4 WSSE, the concepts can be expanded to a 1×N WSSE. It is understood that as N increases, so too do the number of ribbon elements corresponding to each component wavelength signal increase.

Preferably, in a 1×N WSSE, the highest order light is the light that is "thrown away" during equalization. For example, in the 1×2 WSSE the "2" order light is thrown away, and in the 1×4 WSSE the "6" order light is thrown away. This is preferred because the highest order light is the most difficult order to collect. Additionally, as the diffraction angle increase, deleterious effects such as polarization dependent loss and insertion loss increase. As such, the highest order light includes the greatest amount of deleterious effects.

It is further understood that the input signal λ1 can be switched to multiple output ports and be equalized. For example, in the 1×4 WSSE 265, the input signal λ1 can be equalized and switched to OUT2 and OUT3. This is accomplished by combining "1" order pattern 210, "2" order pattern 220, and "6" order pattern 260.

The 1×N WSSE of the present invention has been described in terms of receiving a single component wavelength signal. In the case of a plurality of component wavelength signals, a WDM signal is received and appropriately de-multiplexed into the component wavelength signals. Each component wavelength signals is then appropriately directed to corresponding ribbon elements on the grating light valve type device. The 1×N WSSE of the present invention can also be used as a general switch. In this case, a WDM signal is received and the WDM signal is switched to one or more of the N output channels. There is no need for the WDM signal to be de-multiplexed in this case since the entire WDM signal is switched.

It will be readily apparent to one skilled in the art that other various modifications may be made to the embodiments without departing from the spirit and scope of the invention as defined by the appended claims.

What is claimed:

1. A device comprising a light modulator including a plurality of elements wherein each element is selectively operable such that the plurality of elements are dynamically configurable to combine selected ones of a plurality of grating periods such that selected portions of an incident light are directed into one or more distinct modes wherein each distinct mode corresponds to a grating period.

2. The device according to claim 1 wherein a first group of elements are selectively actuated to determine a first portion of the incident light directed into a first mode, and a second group of elements are selectively actuated to determine a second portion of the incident light directed into a second mode.

3. The device according to claim 2 wherein the first group of elements are actuated in a range between zero and about one-quarter wavelength of the incident light.

4. The device according to claim 2 wherein the second group of elements are actuated in a range between zero and about one-half wavelength of the incident light.

5. The device according to claim 2 wherein the first group of elements are distinct from the second group of elements, and the first group of elements and the second group of elements are concurrently actuated.

6. The device according to claim 2 wherein a third group of elements are selectively actuated to determine a third portion of the incident light directed into a third mode.

7. The device according to claim 1 wherein the device is a 1×N wavelength selective switch and equalizer where N is the number of output channels.

8. The device according to claim 7 wherein the distinct mode corresponding to the smallest grating period comprises an equalization channel, further wherein a portion of the incident light directed to the equalization channel corresponds to an attenuated portion of the light directed to one or more of the output channels.

9. The device according to claim 8 wherein each grating period other than the smallest grating period corresponds to one of the output channels.

10. The device according to claim 1 wherein the incident light comprises a wavelength division multiplexed signal including a plurality of component wavelength signals, and the plurality of elements comprises groups of elements such that each group of elements receives a corresponding one of the component wavelength signals.

11. The device according to claim 1 wherein each distinct mode comprises a distinct diffraction angle of the incident light diffracting off the light modulator.

12. The device according to claim 1 wherein the light modulator comprises a diffractive light modulator.

13. The device according to claim 12 wherein the diffractive light modulator comprises a grating light valve type device.

14. A method of switching and equalizing an input signal, the method comprising:

a. selectively actuating each of a plurality of elements; and b. dynamically configuring the plurality of elements to combine selected ones of a plurality of grating periods such that selected portions of an incident light are directed into one or more distinct modes wherein each distinct mode corresponds to a grating period.

15. The method according to claim 14 wherein selectively actuating each of the plurality of elements includes selectively actuating a first group of elements to determine a first portion of the incident light directed into a first mode, and a selectively actuating a second group of elements to determine a second portion of the incident light directed into a second mode.

16. The method according to claim 15 wherein the first group of elements are actuated in a range between zero and about one-quarter wavelength of the incident light.

17. The method according to claim 15 wherein the second group of elements are actuated in a range between zero and about one-half wavelength of the incident light.

18. The method according to claim 15 wherein the first group of elements are distinct from the second group of elements, and the first group of elements and the second group of elements are concurrently actuated.

19. The method according to claim 15 wherein selectively actuating each of the plurality of elements further comprises selectively actuating a third group of elements to determine a third portion of the incident light directed into a third mode.

20. A device comprising:
a. means for selectively actuating each of a plurality of elements; and
b. means for dynamically configuring the plurality of elements to combine selected ones of a plurality of grating periods such that selected portions of an incident light are directed into one or more distinct modes wherein each distinct mode corresponds to a grating period.

* * * * *